(12) United States Patent
Hosaka

(10) Patent No.: US 12,341,467 B2
(45) Date of Patent: Jun. 24, 2025

(54) SOLAR PANEL INSTALLATION SYSTEM

(71) Applicant: KABUSHIKI KAISHA LAILE, Yamaguchi (JP)

(72) Inventor: Shingo Hosaka, Yamaguchi (JP)

(73) Assignee: KABUSHIKI KAISHA LAILE, Yamaguchi (JP)

( * ) Notice: Subject to any disclaimer, the term of this patent is extended or adjusted under 35 U.S.C. 154(b) by 138 days.

(21) Appl. No.: 18/235,671

(22) Filed: Aug. 18, 2023

(65) Prior Publication Data
US 2023/0396209 A1   Dec. 7, 2023

Related U.S. Application Data

(63) Continuation of application No. PCT/JP2022/005870, filed on Feb. 15, 2022.

(30) Foreign Application Priority Data

Feb. 24, 2021 (JP) .................... 2021-026973
Aug. 25, 2021 (JP) .................... 2021-136992

(51) Int. Cl.
*H02S 20/22* (2014.01)
*H02S 20/30* (2014.01)

(52) U.S. Cl.
CPC .................... *H02S 20/30* (2014.12)

(58) Field of Classification Search
CPC .................. H02S 20/30; H02S 20/22
See application file for complete search history.

(56) References Cited

U.S. PATENT DOCUMENTS

| 10,020,410 | B1 | 7/2018 | Weston | |
| 10,938,337 | B1* | 3/2021 | Carleton | ............... E04B 1/3445 |
| 2016/0230394 | A1* | 8/2016 | Secco | ..................... H02S 40/10 |

FOREIGN PATENT DOCUMENTS

| JP | 2010-199359 A | 9/2010 |
| JP | 2011-129664 A | 6/2011 |
| JP | 2013-194503 A | 9/2013 |
| JP | 6896948 B | 6/2021 |
| WO | 2015-029728 A1 | 3/2015 |

OTHER PUBLICATIONS

International Search Report issued in PCT/JP2022/005870 mailed on Apr. 5, 2022 with English Translation (5 pages).
Written Opinion of International Searching Authority issued in PCT/JP2022/005870 mailed on Apr. 5, 2022 with English Translation (5 pages).

* cited by examiner

*Primary Examiner* — Jayne L Mershon
(74) *Attorney, Agent, or Firm* — Nakanishi IP Associates, LLC

(57) ABSTRACT

A solar panel installation system includes solar panels with orientations or positions changeable. A solar panel installation system (1B) includes a first rail (20) on a rooftop of a building (33), a support carrier (23a) located on the first rail (20), including a portion protruding outward from the building (33), and movable along the first rail (20), a post (10) extending in a vertical direction along a side surface of the building (33) and directly or indirectly supported by the portion of the support carrier (23a) protruding outward from the building (33), a plurality of solar panels (13) fixed to the post (10), and a carrier driver that moves the support carrier (23a) in a first direction along a length of the first rail (20) or in a second direction opposite to the first direction.

12 Claims, 14 Drawing Sheets

SOLAR PANEL INSTALLATION SYSTEM

CROSS-REFERENCE TO RELATED APPLICATIONS

This application is a continuation application of International Patent Application No. PCT/JP2022/005870 filed on Feb. 15, 2022, which claims priority to Japanese Patent Application No. 2021-026973 filed on Feb. 24, 2021 and Japanese Patent Application No. 2021-136992 filed on Aug. 25, 2021, the entire contents of which are incorporated by reference.

BACKGROUND OF INVENTION

Field of the Invention

The present invention relates to a solar panel installation system including solar panels with orientations, positions, or both changeable as intended.

Background Art

Known photovoltaic systems include solar panels suspended from a horizontal bar (e.g., Patent Literature 1).

More specifically, Patent Literature 1 describes, with reference to FIG. 1, a photovoltaic system (1) including three solar panels (10) suspended from a horizontal bar (2). A support (20) is attached to the horizontal bar (2) to support each solar panel (10) in a swingable manner. In other words, each solar panel (10) is suspended from the horizontal bar (2) in a manner swingable substantially orthogonally to the length of the horizontal bar (2).

CITATION LIST

Patent Literature

Patent Literature 1: WO 2015/029728

SUMMARY OF INVENTION

Technical Problem

For mid- or high-rise buildings, multiple solar panels may be installed to cover their entire side surface (e.g., the entire side surface with the balconies). This increases power generation and also creates a unified appearance as compared with when solar panels simply cover a part of the side surface.

However, buildings with relatively many floors such as high-rise buildings use more solar panels arranged in the vertical direction, causing greater difficulty in installing the solar panels. Many solar panels installed in the vertical direction are difficult to be suspended from a horizontal bar as in the structure of the invention described in Patent Literature 1.

Further, multiple solar panels installed along a side surface of a building may be pivoted collectively to face toward sunlight to generate more power. In this case, a single drive may be used to pivot the multiple solar panels arranged continuously in the vertical direction.

However, the drive receives a greater load on its components such as gears to pivot more solar panels installed in the vertical direction.

In response to the above issue with the known system, one or more aspects of the present invention are directed to a solar panel installation system including multiple solar panels installed along a side surface of a building or a structure, with the orientations or the positions of the solar panels or both changeable as intended.

Solution to Problem

A solar panel installation system according to a first aspect includes a first rail, a first support carrier, a first post, a plurality of solar panels, and a carrier driver. The first rail is located on a rooftop of a building or on a structure. The first support carrier is located on the first rail, includes a portion protruding outward from the building or from the structure, and is movable along the first rail. The first post is directly or indirectly supported by the portion of the first support carrier protruding outward from the building or from the structure, and extends in a vertical direction along a side surface of the building or of the structure. The plurality of solar panels are fixed to the first post. The carrier driver moves the first support carrier in a first direction along a length of the first rail or in a second direction opposite to the first direction.

In the structure according to the first aspect, the first rail guides the support carrier in the first direction or in the second direction. The support carrier directly or indirectly supports the post including the solar panels and moves the post along the side surface of the building or of the structure. The post holds the solar panels in series in the vertical direction. The solar panels convert light energy to electrical energy for output. The carrier driver moves the support carrier in the first direction or in the second direction along the length of the first rail.

The above solar panel installation system can thus move a group of solar panels from any side surface of the building or of the structure to an adjacent side surface.

The solar panel installation system according to a second aspect is the solar panel installation system according to the first aspect, in which the building or the structure includes the side surface including a first side surface and a second side surface. The first rail includes a straight first portion extending along the first side surface, a straight second portion extending along the second side surface, and a curved portion connecting the first portion and the second portion. The carrier driver moves the first support carrier from the first portion to the second portion through the curved portion, and moves the first support carrier from the second portion to the first portion through the curved portion.

The structure according to the second aspect has the same effects as in the first aspect. Further, with the first rail including the curved portion, the support carrier and the carrier driver can move the group of solar panels smoothly from the first side surface to the second side surface or from the second side surface to the first side surface.

The solar panel installation system according to a third aspect is the solar panel installation system according to the second aspect, in which the carrier driver moves the first support carrier from the first portion to the second portion in response to a predetermined time point being reached.

The structure according to the third aspect has the same effects as in the second aspect. Further, the support carrier is moved in response to a predetermined time point being reached. This allows the group of solar panels to be moved to a side surface of the building or of the structure expected to receive more sunlight. The system according to the third aspect can thus generate more power.

The solar panel installation system according to a fourth aspect is the solar panel installation system according to the first aspect, in which the carrier driver includes a first winder that moves the first support carrier in the first direction and a second winder that moves the first support carrier in the second direction. The first winder winds a first wire connected to an end of the first support carrier in a movement direction of the first support carrier to move the first support carrier in the first direction. The second winder winds a second wire connected to another end of the first support carrier in the movement direction to move the first support carrier in the second direction.

The structure according to the fourth aspect has the same effects as in the first aspect. Further, the carrier driver has a simple structure including the first winder with the first wire and the second winder with the second wire.

The solar panel installation system according to a fifth aspect is the solar panel installation system according to the second aspect further including a second support carrier, a second post, and a plurality of solar panels. The second support carrier is spaced from the first support carrier in a movement direction of the first support carrier and is movable along the first rail. The second support carrier is coupled to the first support carrier with a coupler. The second support carrier is located on the first rail and includes a portion protruding outward from the building or from the structure. The second post is directly or indirectly supported by the portion of the second support carrier protruding outward from the building or from the structure, and extends in the vertical direction along the side surface of the building or of the structure. The plurality of solar panels are fixed to the second post. The carrier driver moves the first support carrier and the second support carrier from the first portion to the second portion through the curved portion, and moves the first support carrier and the second support carrier from the second portion to the first portion through the curved portion.

The structure according to the fifth aspect includes multiple sets of the support carrier, the post, and the group of solar panels in the second aspect, and the support carriers are coupled together using the coupler.

The system according to the fifth aspect can move the sets of the support carrier, the post, and the group of solar panels collectively from any side surface of the building or of the structure to an adjacent side surface.

The solar panel installation system according to a sixth aspect is the solar panel installation system according to any one of the first to fifth aspects further including a gear fixed directly or indirectly to the first post, and a drive included in the first support carrier. The drive rotates the gear to rotate the first post in a circumferential direction of the first post.

The structure according to the sixth aspect has the same effects as in each of the first to fifth aspects. Further, the gear and the drive for the gear can rotate the post on the support carrier in the circumferential direction of the post.

The system according to the sixth aspect can thus change the orientations of the solar panels as the post rotates.

The solar panel installation system according to a seventh aspect is the solar panel installation system according to the sixth aspect, in which the drive includes a drive gear meshing with the gear, and a motor that rotates the drive gear. The gear rotates in response to rotation of the drive gear.

The structure according to the seventh aspect includes components of the structure according to the sixth aspect being specifically identified, and has the same effects as in the sixth aspect.

In the seventh aspect, the drive has a simple structure including the drive gear and the motor that rotates the drive gear.

The solar panel installation system according to an eighth aspect is the solar panel installation system according to any one of the first to seventh aspects further including a base at a lower end of the first post, a connecting wire placed in a hollow in the tubular first post to connect the base to the portion of the first support carrier protruding outward from the building or from the structure, a hook at a lower end of the connecting wire, and a hook engagement portion on the base. The connecting wire has the lower end connected to the base with the hook being hooked on the hook engagement portion.

The structure according to the eighth aspect has the same effects as in each of the first to seventh aspects. Further, with the post being fixed to the base in the above specific manner, the post can be lighter and driven with a simpler and lighter drive unit.

The solar panel installation system according to a ninth aspect is the solar panel installation system according to any one of the sixth to eighth aspects, in which the first post includes a plate fixed to an upper end of the first post. The gear is fixed to the first post with the plate between the gear and the first post.

The structure according to the ninth aspect has the same effects as in each of the sixth to eighth aspects. Further, the gear can be fixed to the post more strongly with the plate between the gear and the post. Thus, the rotator for the post can be stronger and more durable.

The solar panel installation system according to a tenth aspect is the solar panel installation system according to any one of the first to ninth aspects, in which the first rail is formed from steel. The first support carrier includes a first movable portion movable along the first rail. The first movable portion includes an electromagnet.

The structure according to the tenth aspect has the same effects as in each of the first to ninth aspects. Further, in the tenth aspect, the first rail is formed from steel, and the first movable portion on the support carrier includes the electromagnet. The electromagnet being ON can fasten the support carrier at an intended position on the first rail. The electromagnet being OFF can unfasten the support carrier to be movable along the first rail.

The solar panel installation system according to an eleventh aspect is the solar panel installation system according to any one of the first to tenth aspects further including a second rail at a lower end of the first post. The first post moves with the lower end along the second rail in response to movement of the first support carrier.

The structure according to the eleventh aspect has the same effects as in each of the first to tenth aspects. Further, the system according to the eleventh aspect includes the second rail to increase the stability of the post at its lower end.

The solar panel installation system according to a twelfth aspect is the solar panel installation system according to the eleventh aspect, in which the second rail is formed from steel. The first post includes a second movable portion at the lower end. The second movable portion is movable along the second rail. The second movable portion includes an electromagnet.

The structure according to the twelfth aspect has the same effects as in the eleventh aspect. Further, in the eleventh aspect, the second rail is formed from steel, and the second movable portion at the lower end of the post includes the electromagnet. The electromagnet being ON can fasten the lower end of the post at an intended position on the second rail. The electromagnet being OFF can unfasten the lower end of the post to be movable along the second rail.

Advantageous Effects

The system according to each of the first to twelfth aspects includes the solar panels fixed to the post that is directly or indirectly supported by the portion of the support carrier protruding outward from the building or from the structure. The support carrier is moved by the carrier driver along the length of the rail. This allows the post supported by the support carrier to move from a position adjacent to the first side surface to a position adjacent to the second side surface of the building or of the structure, and also from a position adjacent to the second side surface to a position adjacent to the first side surface. In other words, the solar panel installation system according to each of the first to twelfth aspects can move the solar panels from a position adjacent to a side surface to a position adjacent to another side surface of the building or of the structure.

The system according to each of the sixth to twelfth aspects can change the orientations of the group of solar panels with respect to the vertical axis as intended, in addition to moving the group of solar panels to an intended side surface of the building or of the structure. The solar panel installation system according to each of the sixth to twelfth aspects can thus generate power still more efficiently.

DETAILED DESCRIPTION

A solar panel installation system according to each of a first embodiment and a second embodiment of the present invention will now be described in detail.

1-1 First Embodiment

A solar panel installation system according to the first embodiment of the present invention will now be described with reference to FIGS. 1 to 7. A solar panel installation system 1A (refer to FIG. 1) in the example below is installed to cover the entire side surface of a building 17 (e.g., a mid- or high-rise apartment building).

Figure 1:
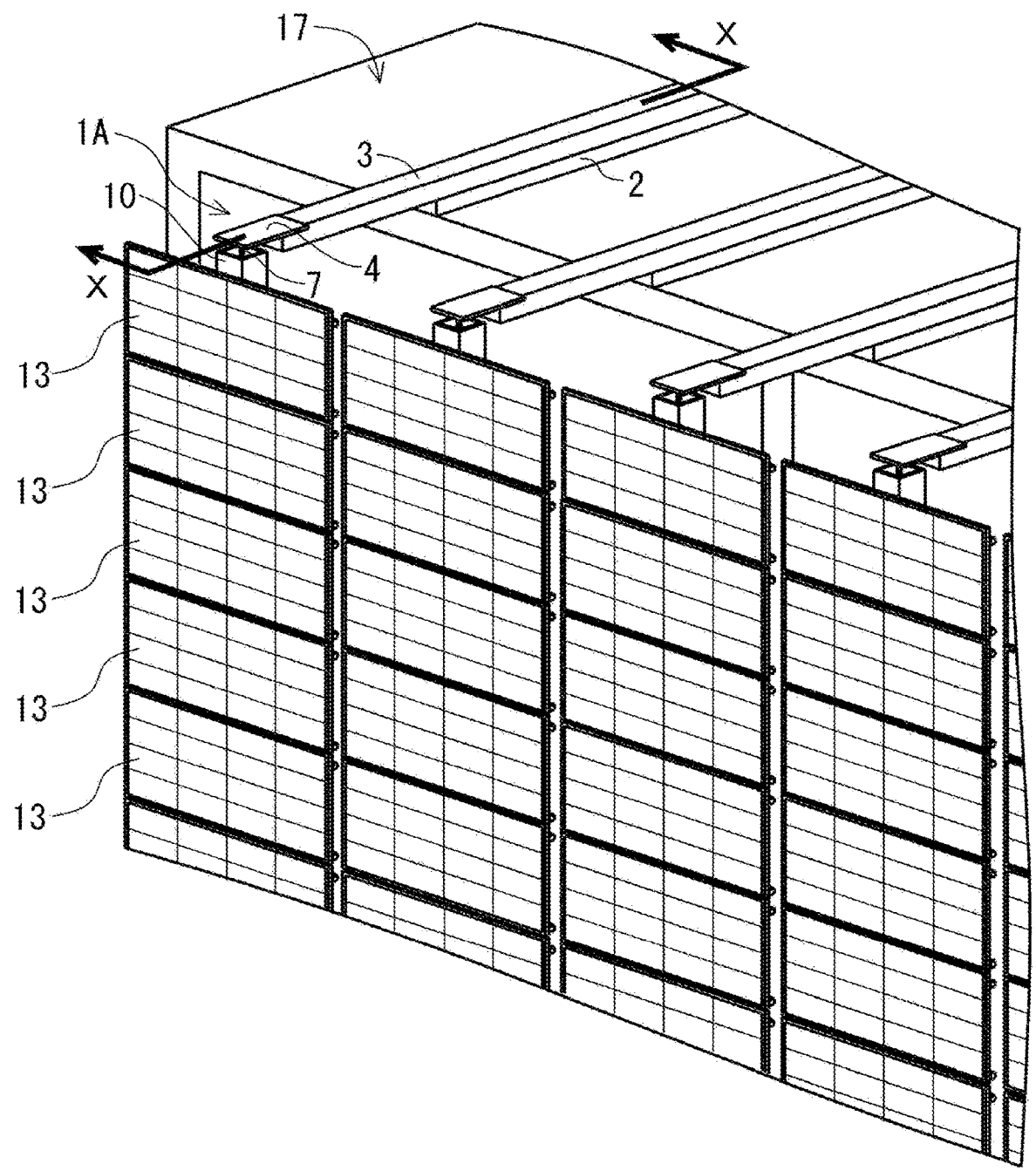
FIG. 1 is an external perspective view of a solar panel installation system according to a first embodiment of the present invention.
Figure 2:
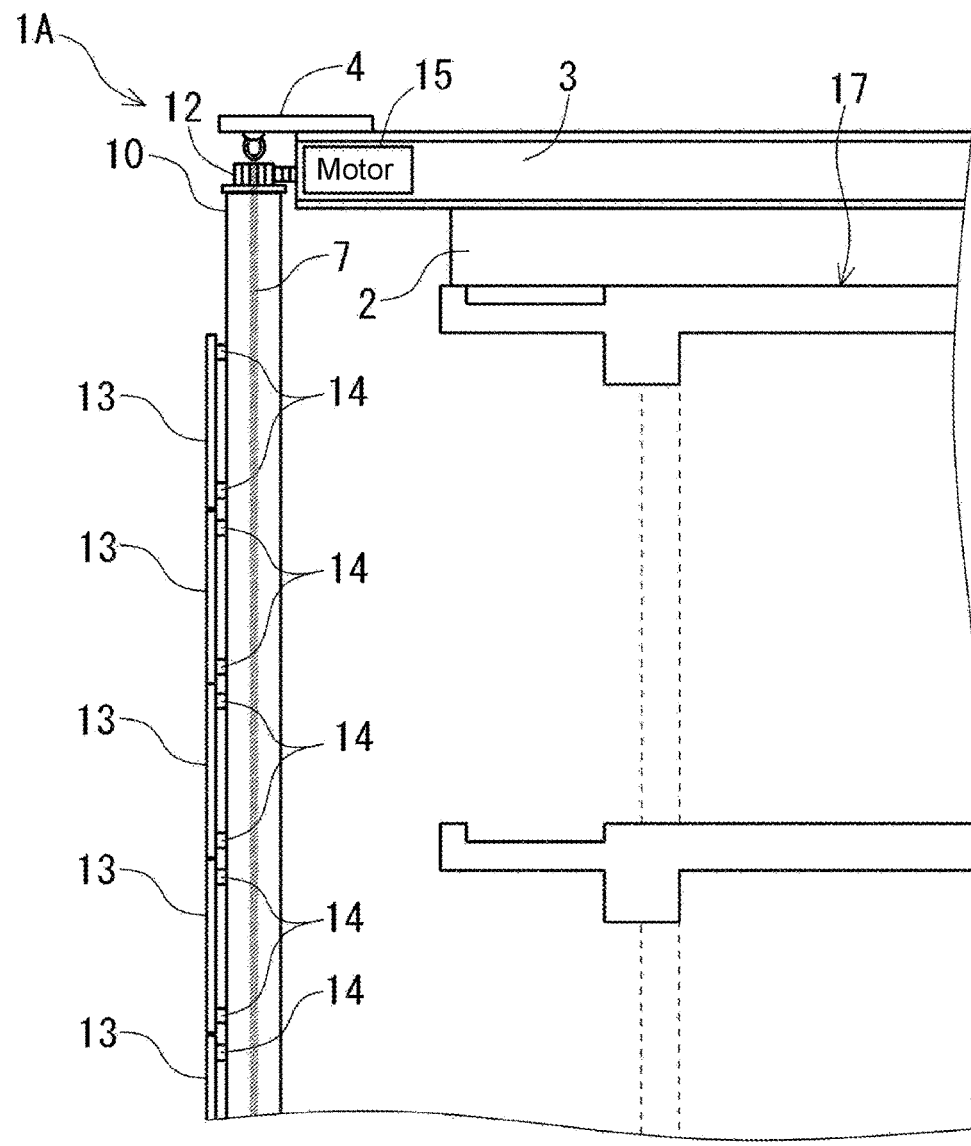
FIG. 2 is a cross-sectional view taken along line X-X in FIG. 1.
Figure 2:
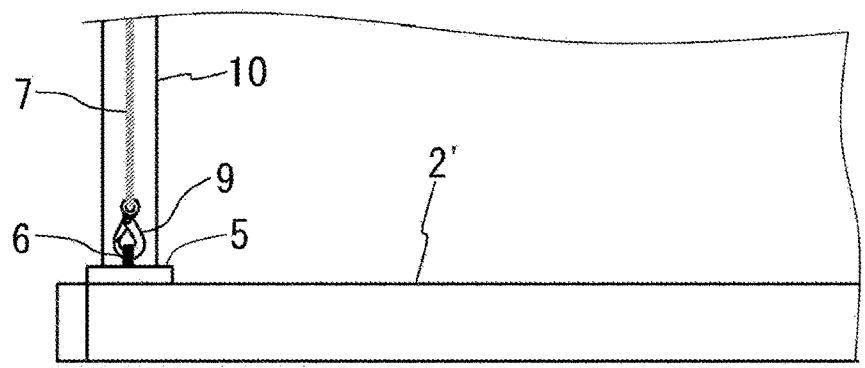

As shown in FIGS. 1 and 2, the solar panel installation system 1A includes concrete foundations 2, beams 3, bases 5, connecting wires 7, posts 10, and solar panels 13.

Each concrete foundation 2 is a structure for supporting the corresponding beam 3 and is located on the rooftop of the building 17.

Each beam 3 is a steel H-beam supported and fixed on the concrete foundation 2. The beam 3 includes a portion protruding over the balconies. The beam 3 includes a support plate 4 at its end protruding over the balconies. The support plate 4 is welded and fixed to the upper surface of the steel H-beam.

Each base 5 is a plate supporting the post 10. The base 5 is suspended by the connecting wire 7.

The connecting wire 7 suspends the base 5 and the post 10 located on the base 5.

The post 10 is a support to which the multiple solar panels 13 are fixed continuously in the vertical direction. More specifically, for example, the post 10 has a rectangular cross section and is hollow and elongated in the vertical direction.

As shown in FIG. 2, the post 10 is located on the base 5 and extends in the vertical direction. The connecting wire 7 is placed in the hollow in the post 10 located on the base 5.

The post 10 also includes a support frames 14 to fix the solar panels 13. For example, the multiple solar panels 13 are fixed to the post 10 with the support frames 14.

The beam 3 includes, in its portion protruding over the balconies, a motor 15 for rotating a drive gear 16 (refer to FIGS. 3 and 4, described later).

Figure 3:
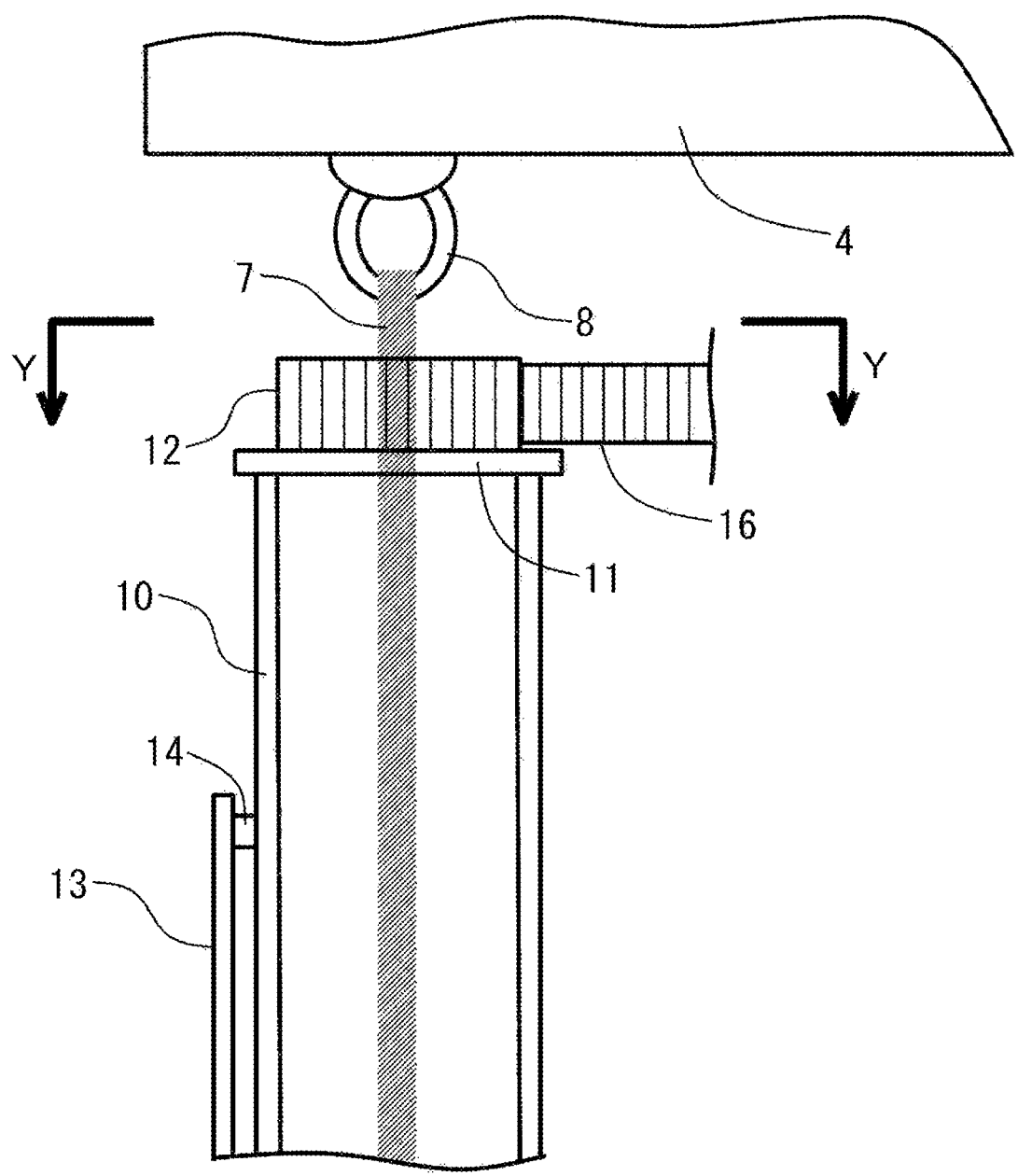
FIG. 3 is an enlarged view of a post and a wire, showing a portion adjacent to their upper ends.

As shown in FIG. 3, the post 10 includes a lid plate 11 welded to its upper end. The lid plate 11 has a hole at the center to receive the connecting wire 7.

The lid plate 11 includes a follower gear 12 welded to its upper surface. The follower gear 12 has a hole at the center to receive the connecting wire 7.

Figure 4:
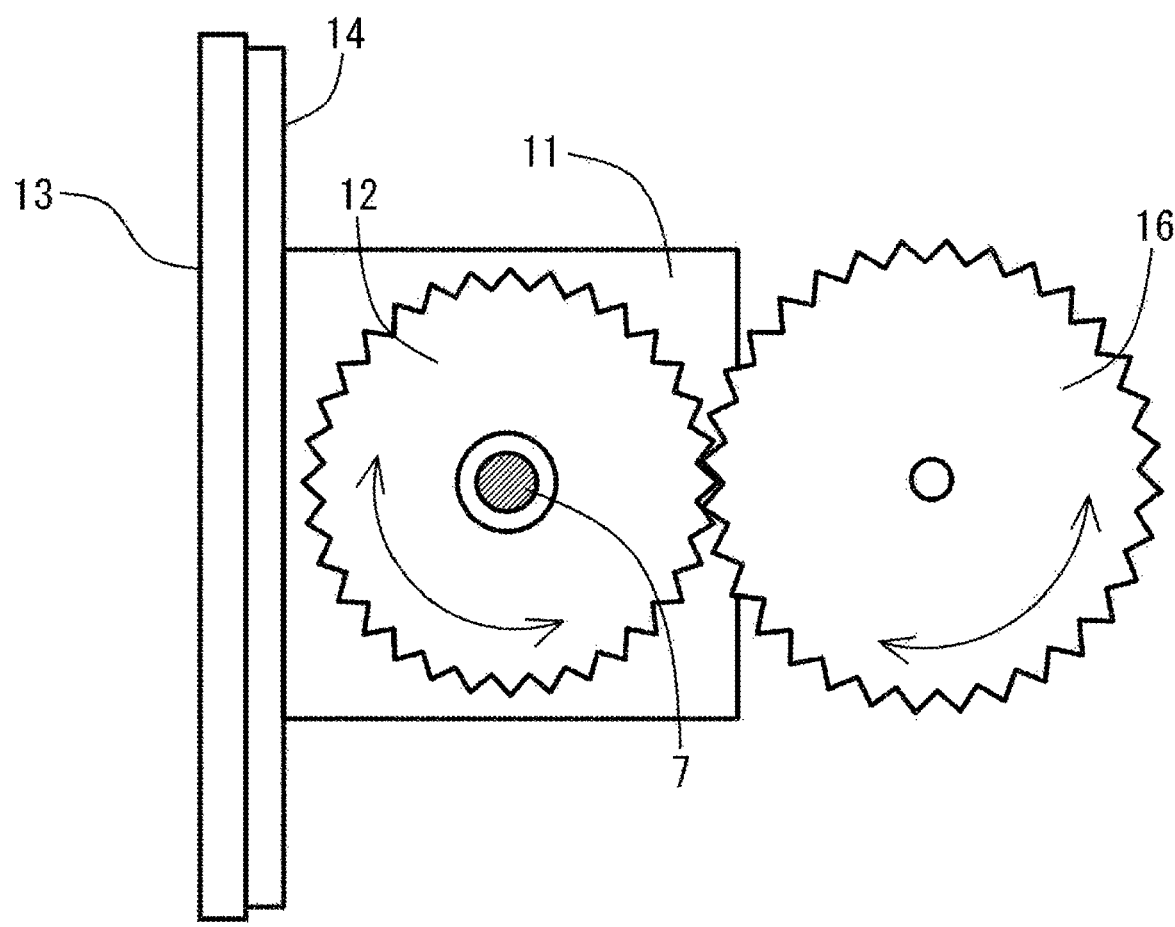
FIG. 4 is a cross-sectional view taken along line Y-Y in FIG. 3.

As shown in FIG. 4, the follower gear 12 meshes with the drive gear 16 drivable by the motor 15, and rotates in response to rotation of the drive gear 16. When the follower gear 12 rotates, the lid plate 11 to which the follower gear 12 is welded and the post 10 to which the lid plate 11 is welded rotate together. When the post 10 rotates, the multiple solar panels 13 fixed to the post 10 are pivoted accordingly.

Although the drive gear 16 has a greater diameter than the follower gear 12 in the present example, the drive gear 16 may have, for example, a smaller or the same diameter as the follower gear 12.

As shown in FIG. 3, the support plate 4 optionally includes, on its lower surface, a wire support ring 8 to which the upper end of the connecting wire 7 is fixed. The upper end of the connecting wire 7 is connected to the support plate 4 with the wire support ring 8 between them, and is thus connected to the beam 3 on which the support plate 4 is located.

Figure 5:
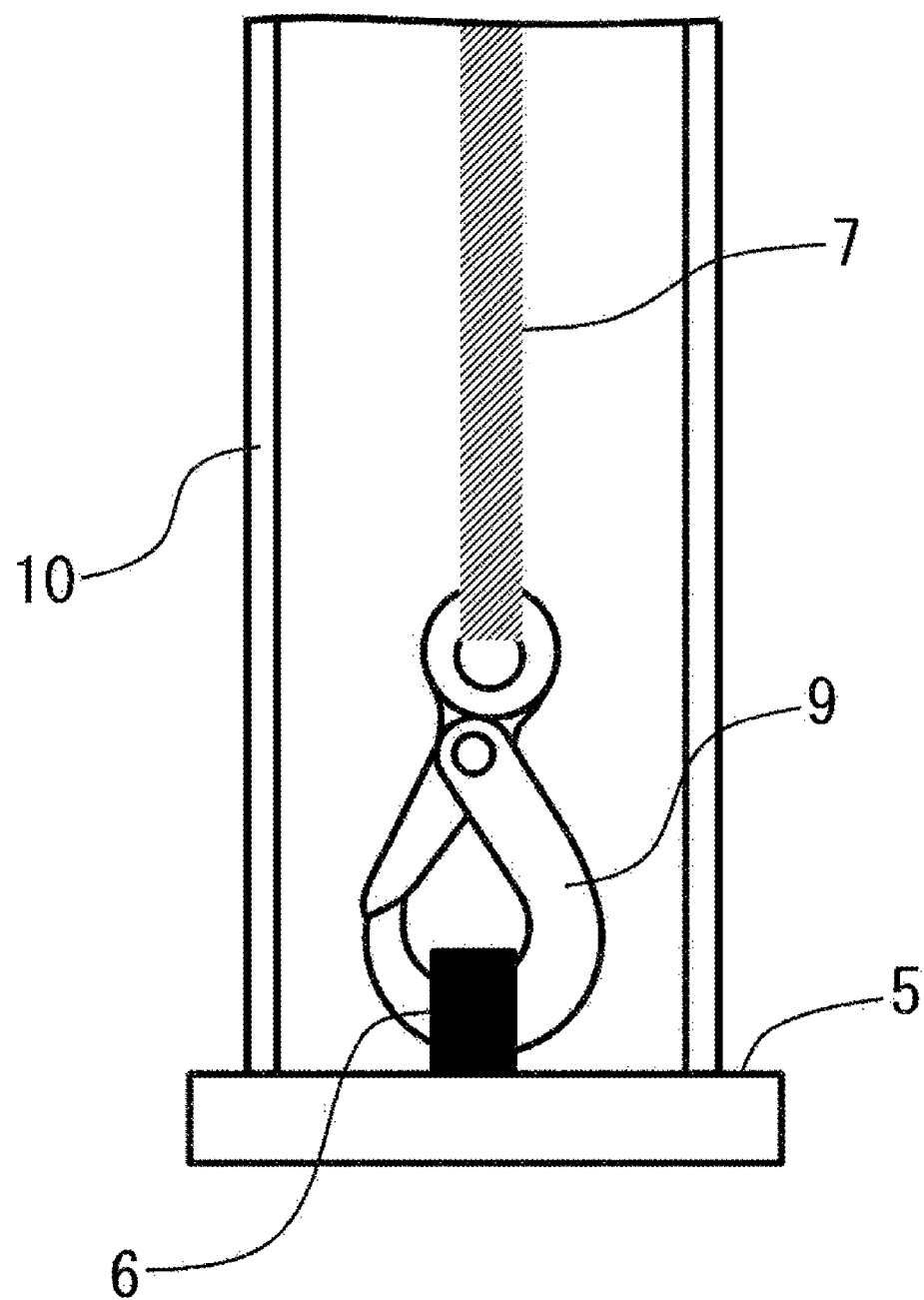
FIG. 5 is an enlarged view of the post and the wire, showing a portion adjacent to their lower ends.

As shown in FIG. 5, the connecting wire 7 has the lower end connected to a hook 9. The base 5 includes, on its upper surface, a hook engagement portion 6 (a component with a hole to receive the hook). The hook 9 is hooked on the hook engagement portion 6 to connect the lower end of the connecting wire 7 to the base 5. Thus, the connecting wire 7 suspends the base 5, or in other words, the base 5 is suspended by the connecting wire 7.

The post 10 is located (supported) on the base 5 suspended by the connecting wire 7. The post 10 is thus suspended by the connecting wire 7.

The operation for controlling the orientations of the surfaces of the solar panels 13 will now be described with reference to FIGS. 6 and 7.

To generate more power from sunlight, the solar panels 13 may be oriented to have the surfaces orthogonal to the direction of sunlight. Thus, the motor 15 in the first embodiment of the present invention is controlled to pivot the solar panels 13 to face in the direction of sunlight.

Figure 6:
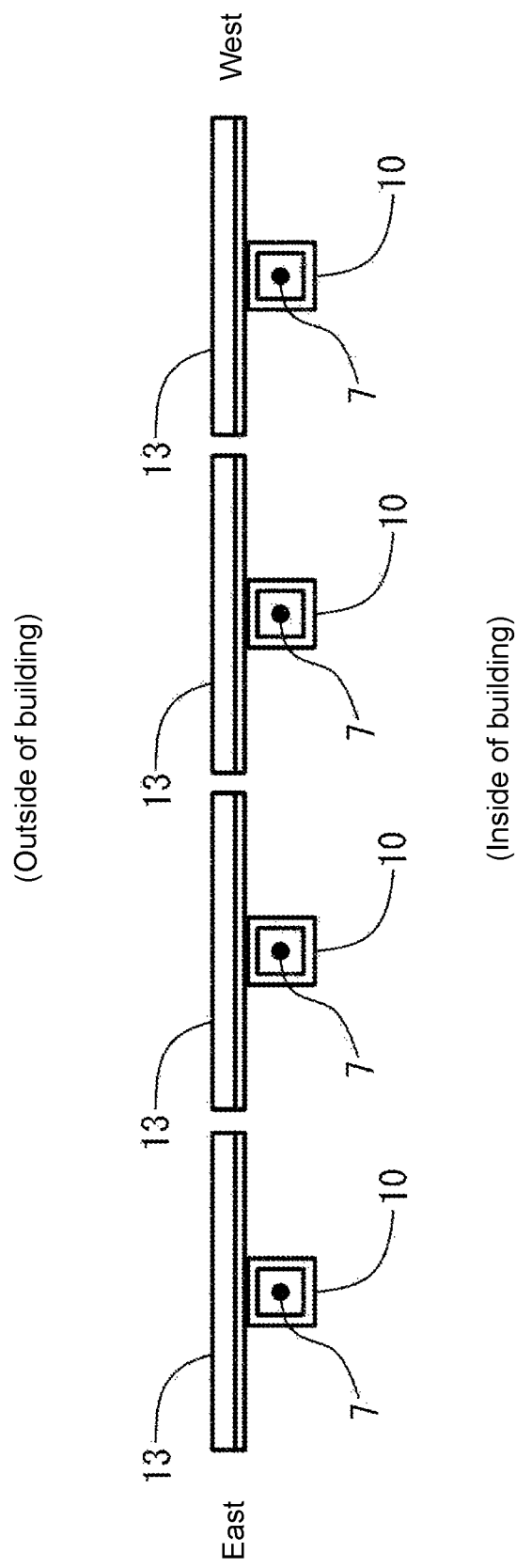
FIG. 6 is a schematic diagram of posts and solar panels fixed to the posts, as viewed from above.

FIG. 6 shows the solar panels 13 with the surfaces aligned parallel to a side surface of the building 17. In the example in FIG. 6, the solar panels 13 are installed on the building 17 having its inside on the north and its outside (with balconies) on the south.

Figure 7:
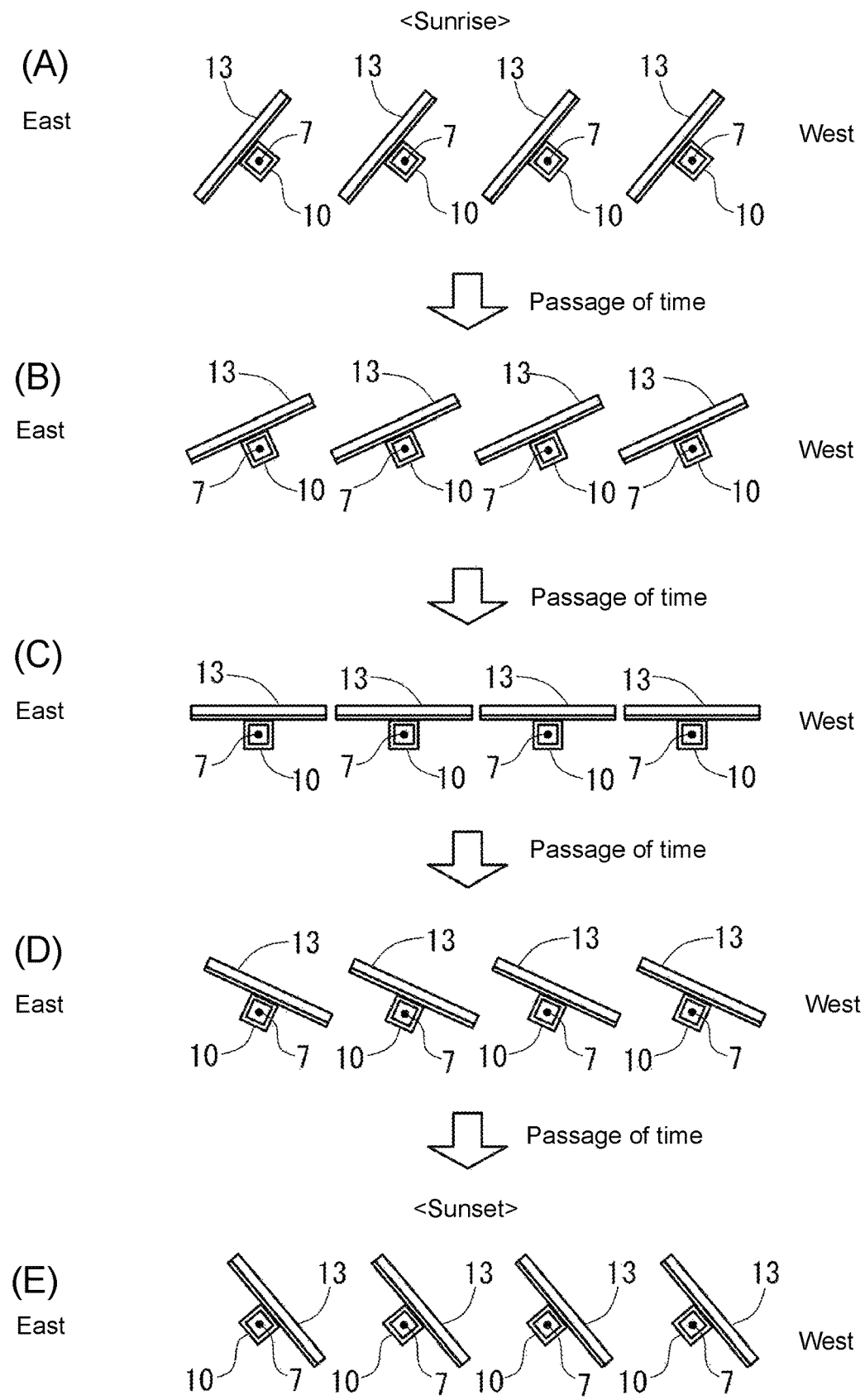
FIG. 7 shows schematic diagrams of solar panels pivoted to face in the direction of sunlight.

For a south-facing apartment building, the motor 15 is controlled to rotate the post 10 to cause the solar panels 13 to have the surfaces facing east at a sunrise time, as shown in (A) of FIG. 7.

As time passes, the motor 15 is controlled to rotate the post 10 clockwise to cause the solar panels 13 to have the surfaces facing gradually toward south, as shown in (B) of FIG. 7.

As time passes, the motor 15 is controlled to further rotate the post 10 clockwise to cause the solar panels 13 to have the surfaces facing south around noon, as shown in (C) of FIG. 7.

After noon, the motor 15 is controlled to further rotate the post 10 clockwise to cause the solar panels 13 to have the surfaces facing gradually toward west, as shown in (D) of FIG. 7.

Then, the motor 15 is controlled to further rotate the post 10 clockwise to cause the solar panels 13 to have the surfaces facing west at a sunset time, as shown in (E) of FIG. 7.

The motor 15 is controlled in the above manner to maintain the surfaces of the solar panels 13 to be substantially orthogonal to the direction of sunlight.

In the above first embodiment, the multiple solar panels 13 are fixed to the post 10 located on the base 5. The post 10 is suspended by the connecting wire 7 from the beam 3 (specifically, from the support plate 4). This allows the multiple solar panels 13 to be stably installed in the vertical direction along the side surface (with the balconies) of a building (a mid- or high-rise apartment building).

In the first embodiment, in particular, the post 10 suspended by the connecting wire 7 can be rotated with a less load on the follower gear 12, the drive gear 16, and the motor 15.

In the first embodiment, the multiple solar panels 13 are fixed to the post 10 continuously in the vertical direction. The multiple solar panels 13 can thus be pivoted collectively using the single motor 15.

1-2 Modification of First Embodiment

The solar panel installation system according to the present invention is not limited to the above first embodiment, and may be changed or modified variously without departing from the spirit and scope of the present invention.

In the first embodiment, for example, the upper end of the connecting wire 7 is fixed to the support plate 4 located on the beam 3. In some embodiments, the upper end of the connecting wire 7 may be fixed directly to the beam 3 without the support plate 4.

In the first embodiment of the present invention, the solar panel installation system 1A is installed on a mid- or high-rise apartment building. In some embodiments, the solar panel installation system 1A may be installed on, for example, an office building with relatively many floors.

In the first embodiment, the follower gear 12 is located at the upper end of the post 10. In some embodiments, the follower gear 12 may be at another position such as near the center of the post 10 in the vertical direction.

In the first embodiment of the present invention, the solar panel installation system 1A is added to an existing mid- or high-rise apartment building using the concrete foundations 2 located on the rooftop of the building 17. In some embodiments, the system may be installed as standard equipment in a mid- or high-rise apartment building at the time of construction. In this case, the beams 3 may be installed directly without the concrete foundations 2.

Further, in the first embodiment of the present invention, the solar panel installation system 1A is added to an existing building 17, such as a mid- or high-rise apartment building. In some embodiments of the present invention, the solar panel installation system 1A may be installed on a structure (not shown) intended to incorporate the solar panel installation system 1A, such as a steel or wooden framework or a reinforced concrete structure.

1-3 First Embodiment of Invention

The above solar panel installation system 1A according to the first embodiment may be defined as aspects 1 to 5 below.

1. A solar panel installation system (1A), comprising:
   a plurality of solar panels (13) arranged continuously in a vertical direction along a side surface of a building (17) or of a structure;
   a beam (3) fixed to a rooftop of the building (17) or to a top surface of the structure, the beam (3) including a portion protruding from the side surface of the building (17) or of the structure;
   a connecting wire (7) extending in the vertical direction and having an upper end connected directly or indirectly to the portion of the beam (3) protruding from the side surface;
   a base (5) connected to a lower end of the connecting wire (7);
   a post (10) being tubular, being located on the base (5), and extending from the base (5) toward the beam (3), with the connecting wire (7) being placed in a hollow in the post (10);
   a gear (e.g., the follower gear 12) fixed directly or indirectly to the post (10); and
   a drive configured to rotate the gear (e.g., the follower gear 12) to rotate the post (10),
   wherein the plurality of solar panels (13) are fixed to the post (10) continuously in the vertical direction, with each of the plurality of solar panels (13) having a surface extending in the vertical direction.

2. The solar panel installation system (1A) according to aspect 1, further comprising:
   a hook (9) at a lower end of the connecting wire (7); and
   a hook engagement portion (6) on the base (5),
   wherein the connecting wire (7) has the lower end connected to the base (5) with the hook (9) being hooked on the hook engagement portion (6).

3. The solar panel installation system (1A) according to aspect 1 or aspect 2, wherein the post (10) includes a fixing frame (e.g., the support frame 14) to fix the plurality of solar panels (13), and the plurality of solar panels (13) are fixed to the post (10) with the fixing frame (e.g., the support frame 14).

4. The solar panel installation system (1A) according to any one of aspects 1 to 3, wherein the drive includes a drive gear (16) meshing with the gear (e.g., the follower gear 12), and a motor (15) configured to rotate the drive gear (16), and the gear (e.g., the follower gear 12) rotates in response to rotation of the drive gear (16).

5. The solar panel installation system (1A) according to any one of aspects 1 to 4, further comprising:

a plate (e.g., the lid plate 11) fixed to an upper end of the post (10), the plate having a hole receiving the connecting wire (7), wherein the gear (e.g., the follower gear 12) is fixed to the post (10) with the plate (e.g., the lid plate 11) between the gear and the post (10).

1-4 Effects of Aspects 1 to 5

In the system according to aspect 1, the solar panels 13 are fixed to the post 10 located on the base 5. The post 10 is suspended from the beam 3 by the connecting wire 7 connected to the base 5. This allows the multiple solar panels 13 to be stably installed in the vertical direction along the side surface of the building 17 or of the structure. The multiple solar panels 13, which are fixed to the post 10 continuously in the vertical direction, can be pivoted collectively using the common drive.

Thus, in the system according to aspect 1, the solar panels 13 can be pivoted as intended in the circumferential direction of the post 10 to face in a direction to generate more power. The system according to aspect 1 can thus generate power more efficiently than using solar panels 13 that are not pivotable in the circumferential direction of the post 10.

The system according to aspect 2 has the same effects as in aspect 1. Further, the connecting wire 7 is connected to the base 5 using the hook 9, thus simplifying the structure and the work for the connection.

The system according to aspect 3 has the same effects as in aspect 1 or aspect 2. Further, the solar panels 13 can be fixed to the post 10 more strongly with the fixing frame (e.g., the support frame 14). Thus, the entire system according to aspect 3 can be stronger and more durable.

The system according to aspect 4 has the same effects as in each of aspects 1 to 3. Further, the drive has a simple structure. The system according to aspect 4 can thus be installed and maintained at lower cost.

The system according to aspect 5 has the same effects as in each of aspects 1 to 4. Further, the gear (e.g., the follower gear 12) can be fixed to the post 10 more strongly. Thus, the entire system according to aspect 5 can be more durable.

2-1 Second Embodiment

A solar panel installation system according to the second embodiment of the present invention will now be described with reference to FIGS. 8 to 13. A solar panel installation system 1B (refer to FIG. 8) in the example below is installed on a side surface of a building 33 (e.g., a mid- or high-rise building).

Figure 8:
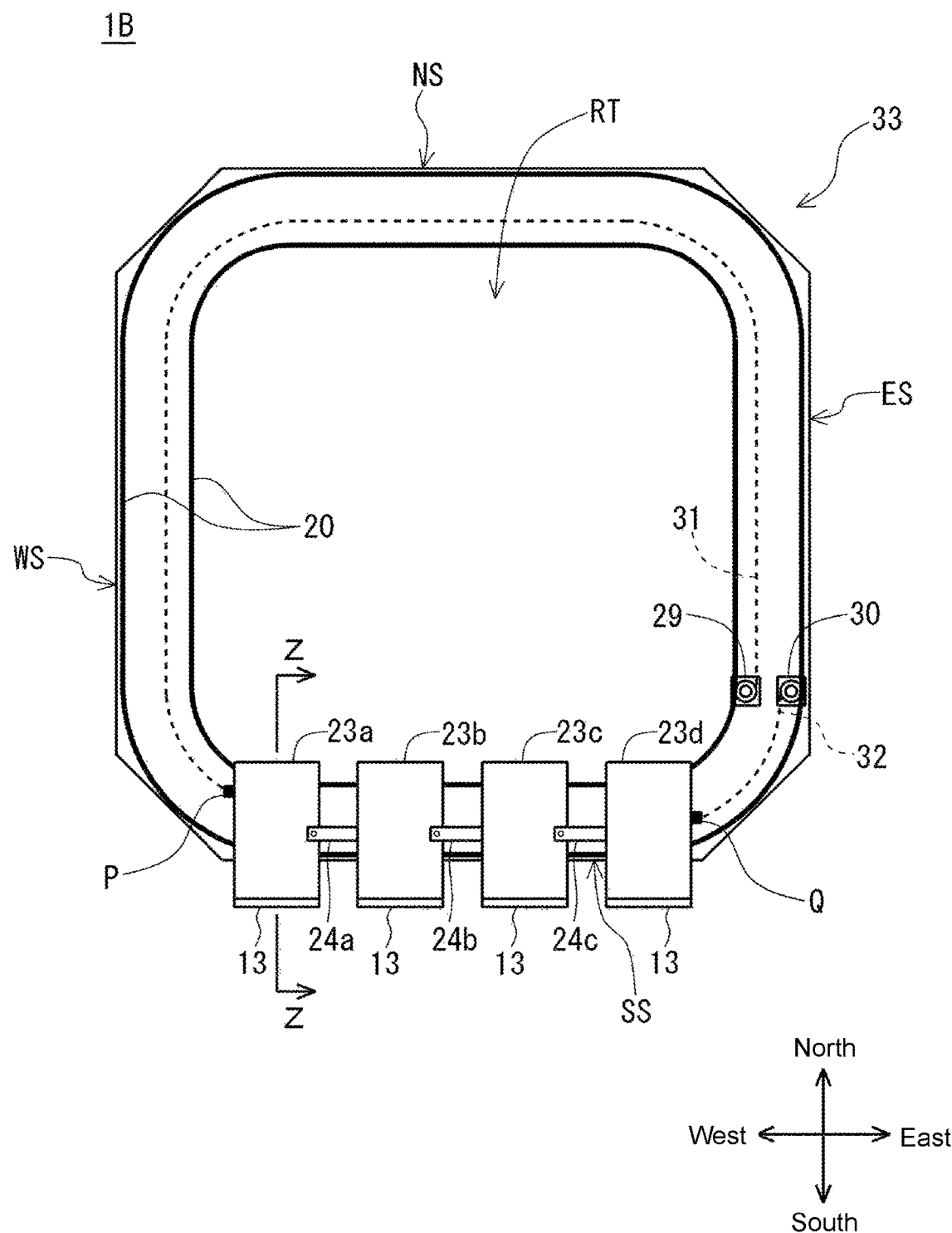
FIG. 8 is a plan view of a solar panel installation system according to a second embodiment of the present invention.

As shown in FIG. 8, the solar panel installation system 1B includes a first rail 20 on a rooftop RT of the building 33, four support carriers 23a, 23b, 23c, and 23d, and winders 29 and 30.

As shown in FIG. 8, the building 33 is a mid- or high-rise building having an east side surface ES, a west side surface WS, a south side surface SS, and a north side surface NS.

The first rail 20 is, for example, a loop along the side surface ES, the side surface NS, the side surface WS, and the side surface SS on the rooftop RT of the building 33.

Figure 10:
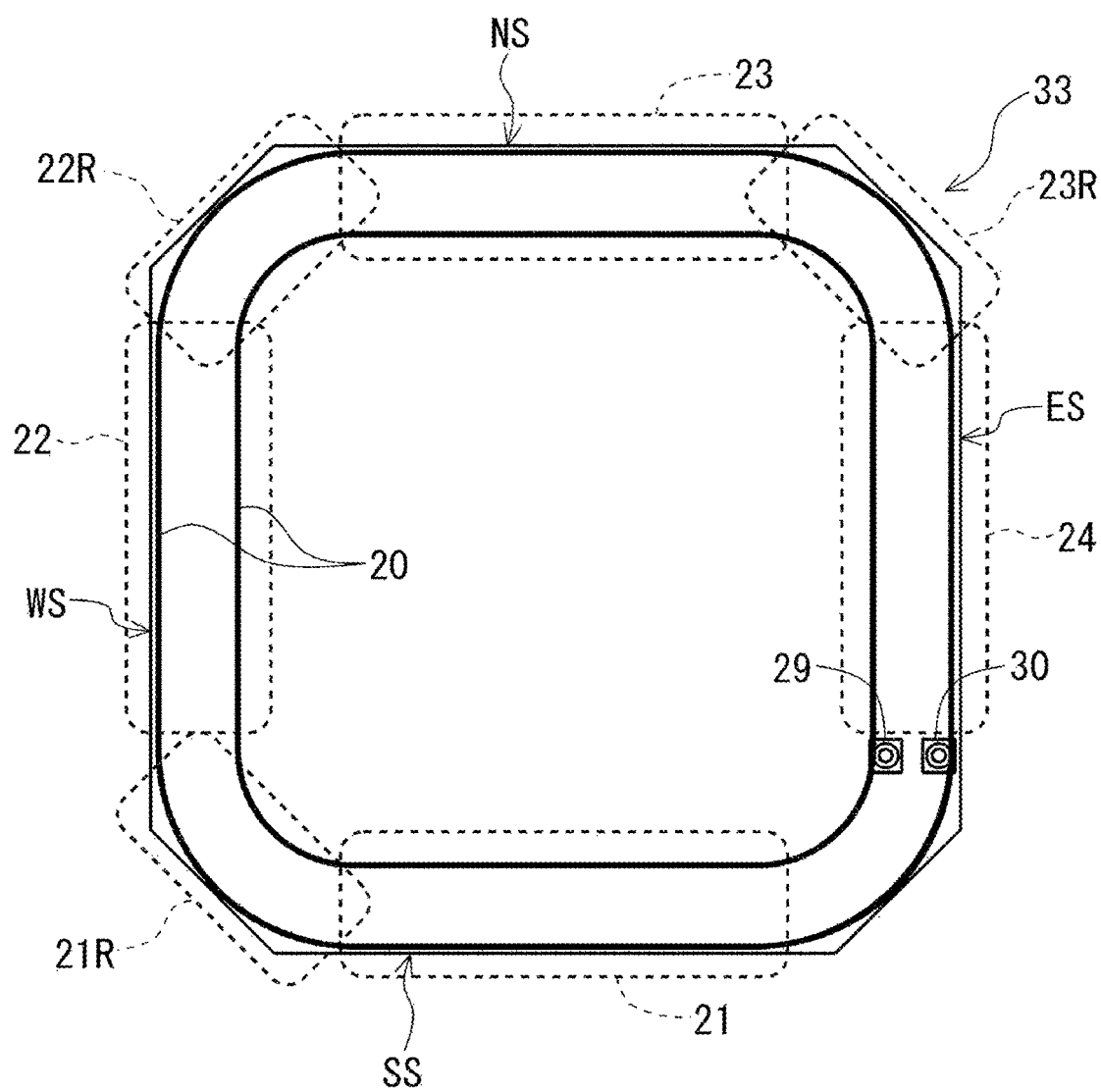
FIG. 10 is a schematic plan view of a rail, describing different portions of the rail.

As shown in FIG. 10, the first rail 20 has, for example, a straight portion 21, a curved portion 21R, a straight portion 22, a curved portion 22R, a straight portion 23, a curved portion 23R, and a straight portion 24.

The straight portion 21 extends along the south side surface SS and is an example of a first portion in one or more aspects of the present invention.

The straight portion 22 extends along the west side surface WS and is an example of a second portion in one or more aspects of the present invention.

The curved portion 21R connects the straight portion 21 and the straight portion 22 and is an example of a curved portion in one or more aspects of the present invention.

The straight portion 23 extends along the north side surface NS. The straight portion 24 extends along the east side surface ES. The curved portion 23R connects the straight portion 23 and the straight portion 24.

The four support carriers 23a, 23b, 23c, and 23d are, for example, located on the first rail 20 in a movable manner. The four support carriers 23a, 23b, 23c, and 23d on the first rail 20 are spaced from each other in the movement direction (along the length of the first rail 20).

For ease of explanation, the support carrier 23a herein is defined as the lead carrier, and the support carrier 23d is defined as the rear carrier.

As shown in FIG. 8, the support carrier 23a includes a portion protruding outward (southward) from the side surface SS of the building 33. Similarly, each of the support carrier 23b, the support carrier 23c, and the support carrier 23d also includes a portion protruding outward (southward) from the side surface SS of the building 33.

Figure 9:
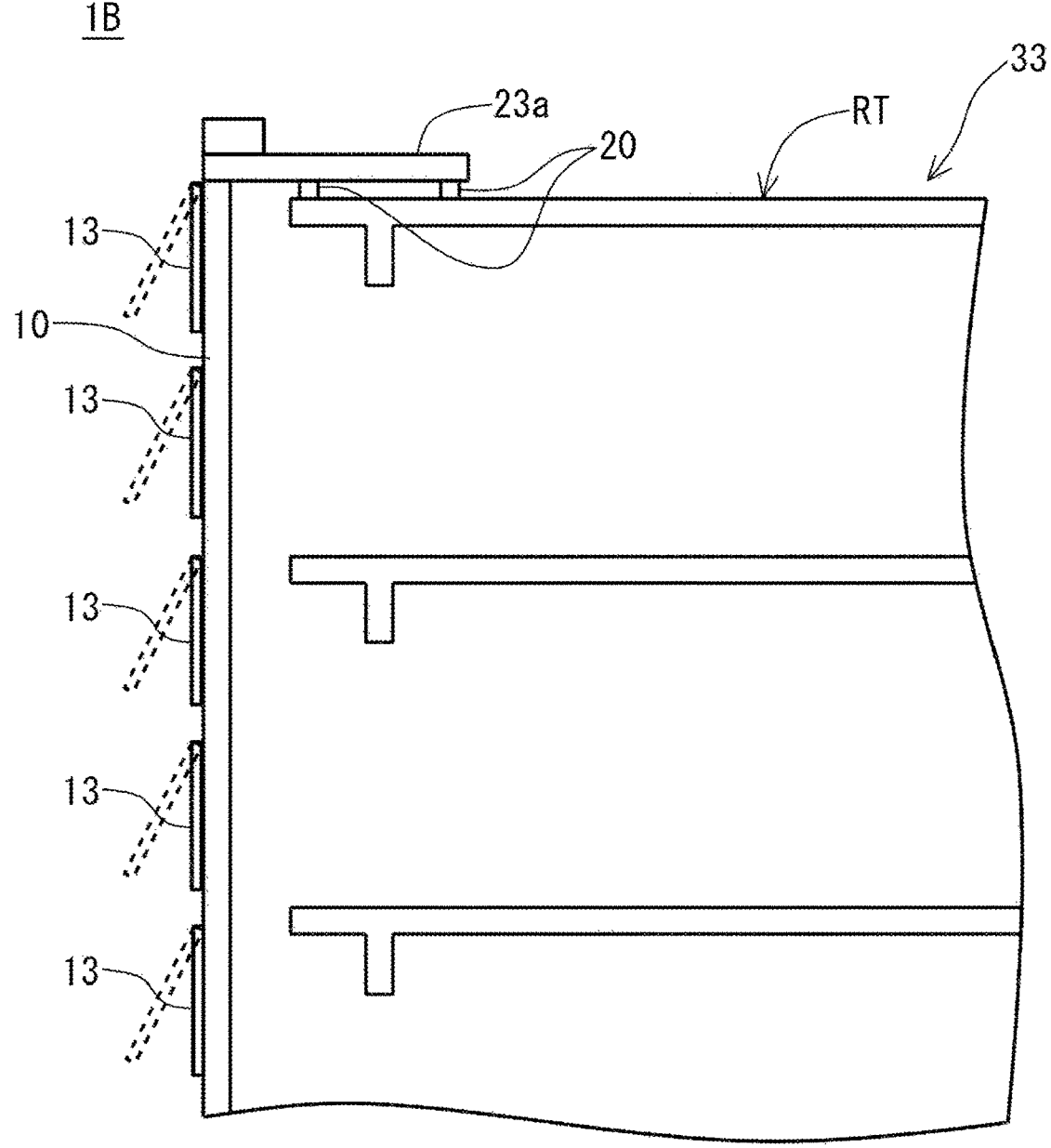
FIG. 9 is a cross-sectional view taken along line Z-Z in FIG. 8.
Figure 9:
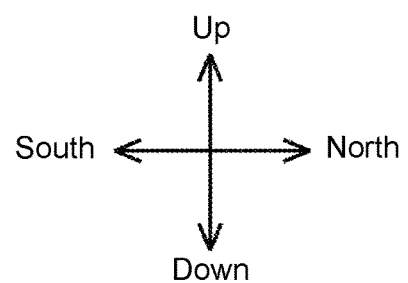

As shown in FIG. 9, the portion of the support carrier 23a protruding outward from the side surface SS of the building 33 is connected to the upper end of the post 10 extending in the vertical direction along the south side surface SS (refer to FIG. 8). The multiple solar panels 13 are arranged on the post 10 at predetermined intervals in the vertical direction. Each solar panel 13 is pivotable about its upper end (refer to the dashed lines in FIG. 9).

Although not shown, the portion of each of the support carriers 23b, 23c, and 23d protruding outward from the side surface SS of the building 33 has a similar structure.

As shown in FIG. 8, the support carrier 23a and the support carrier 23b are coupled with a coupler 24a. Similarly, the support carrier 23b and the support carrier 23c are coupled with a coupler 24b. The support carrier 23c and the support carrier 23d are coupled with a coupler 24c.

Figure 11:
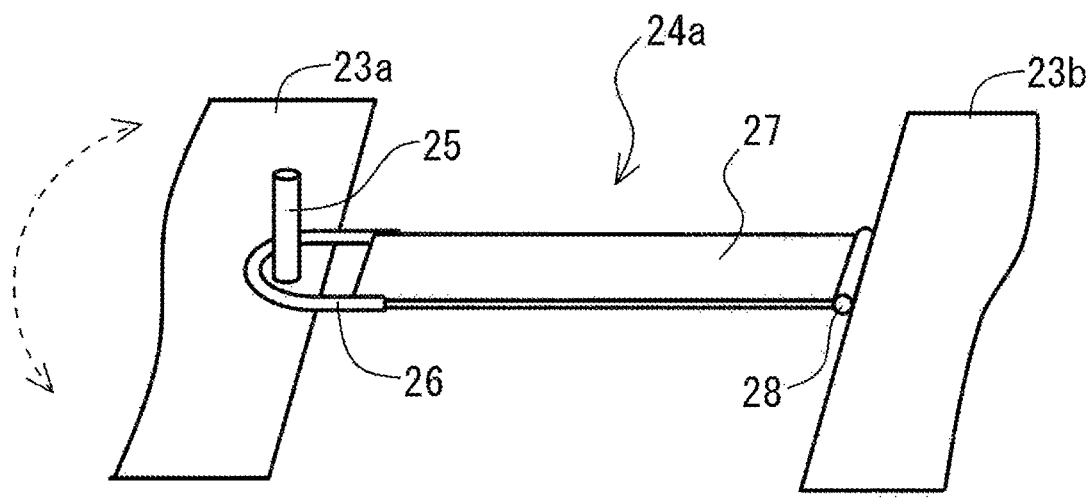
FIG. 11 is a schematic perspective view of a coupler coupling support carriers together.

As shown in FIG. 11, the coupler 24a includes, for example, a column 25, a U-shaped member 26, a coupler plate 27, and a hinge shaft 28.

The column 25 is located at the rear end of the support carrier 23a being the lead carrier. The column 25 is elongated in the vertical direction.

The U-shaped member 26 is fixed to the front end of the coupler plate 27. The column 25 is placed inside the space defined by the U-shaped member 26 when the support carrier 23a and the support carrier 23b are coupled.

The coupler plate 27 connects the rear end of the support carrier 23a to the front end of the support carrier 23b.

The hinge shaft 28 is located at the front end of the support carrier 23b to allow the coupler plate 27 to pivot in the vertical direction.

In the state shown in FIG. 11, the coupler plate 27 can be lifted upward about the hinge shaft 28 to remove the U-shaped member 26 from the column 25. This disconnects the support carrier 23b from the support carrier 23a.

The couplers 24b and 24c have the same structure as the above coupler 24a, and thus are not described.

The four support carriers 23a to 23d coupled together using the couplers 24a, 24b, and 24c can turn along the curved portions 21R, 22R, and 23R.

Referring back to FIG. 8, the winders 29 and 30 will now be described. The winders 29 and 30 are each an example of a carrier driver in one or more aspects of the present invention, and are used to move the four support carriers 23a, 23b, 23c, and 23d together.

The winder 29 winds a wire 31. The winder 29 unwinds the wire 31 counterclockwise along the first rail 20, or winds the wire 31 clockwise along the first rail 20. The wire 31 has an end connected to a front end P of the support carrier 23a being the lead carrier.

The winder 30 winds a wire 32. The winder 30 unwinds the wire 32 clockwise along the first rail 20, or winds the wire 32 counterclockwise along the first rail 20. The wire 32 has an end connected to a rear end Q of the support carrier 23d being the rear carrier.

For example, when the four support carriers 23a to 23d are on the straight portion 21 (FIG. 10) of the first rail 20 as shown in FIG. 8, the winder 29 winds the wire 31 to move the four support carriers 23a to 23d clockwise along the first rail 20. In this case, the winder 30 unwinds the wire 32 clockwise.

Figure 12:
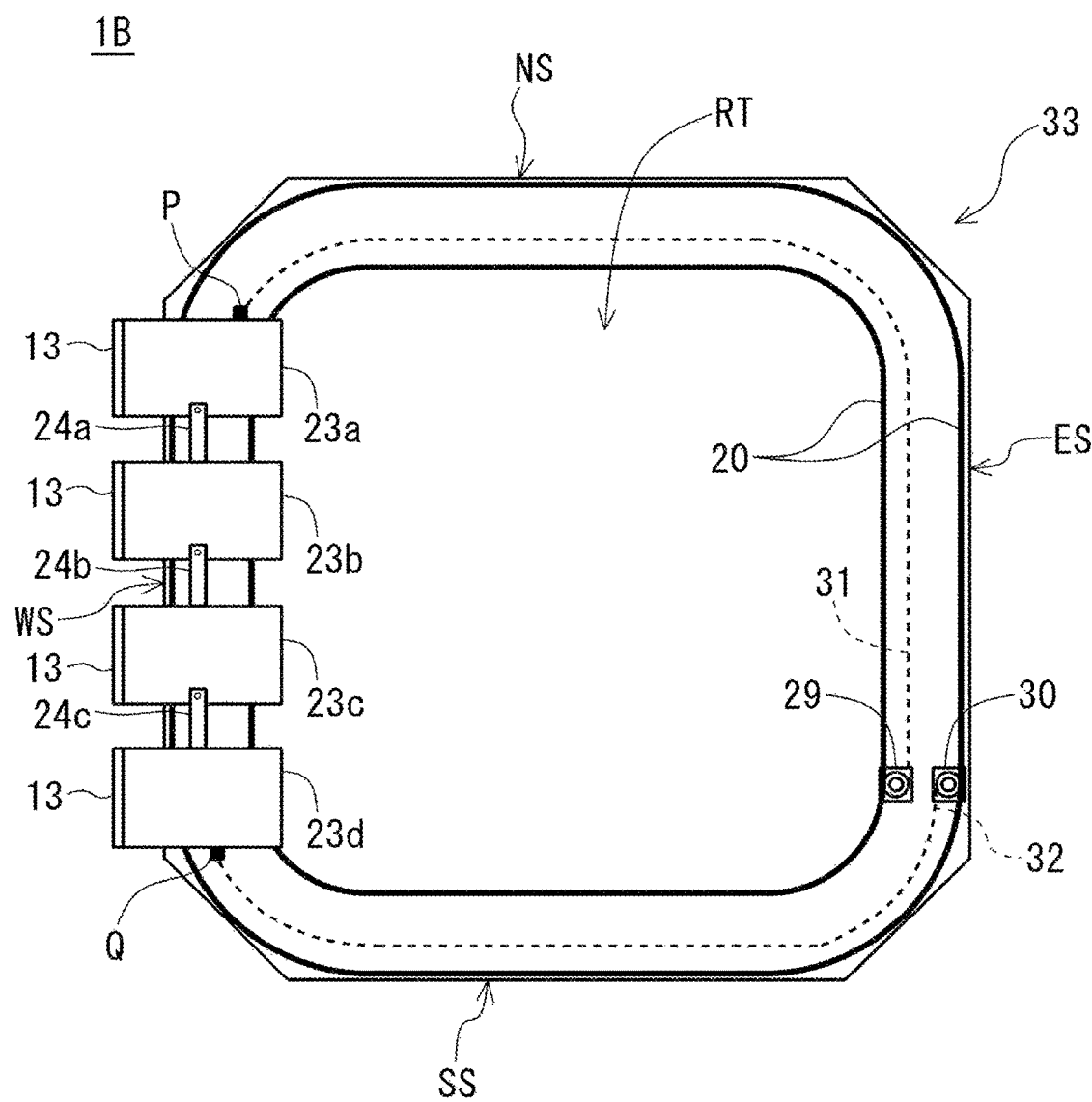
FIG. 12 is a plan view of multiple support carriers located on the west.

The four support carriers 23a to 23d move through the curved portion 21R (FIG. 10) of the first rail 20 to the straight portion 22 (FIG. 10) of the first rail 20, as shown in FIG. 12. When the four support carriers 23a to 23d are on the straight portion 22 (FIG. 10) as shown in FIG. 12, the four posts 10 (and the multiple solar panels 13 fixed to the posts 10) supported by the four support carriers 23a to 23d are adjacent to the west side surface WS.

Figure 13:
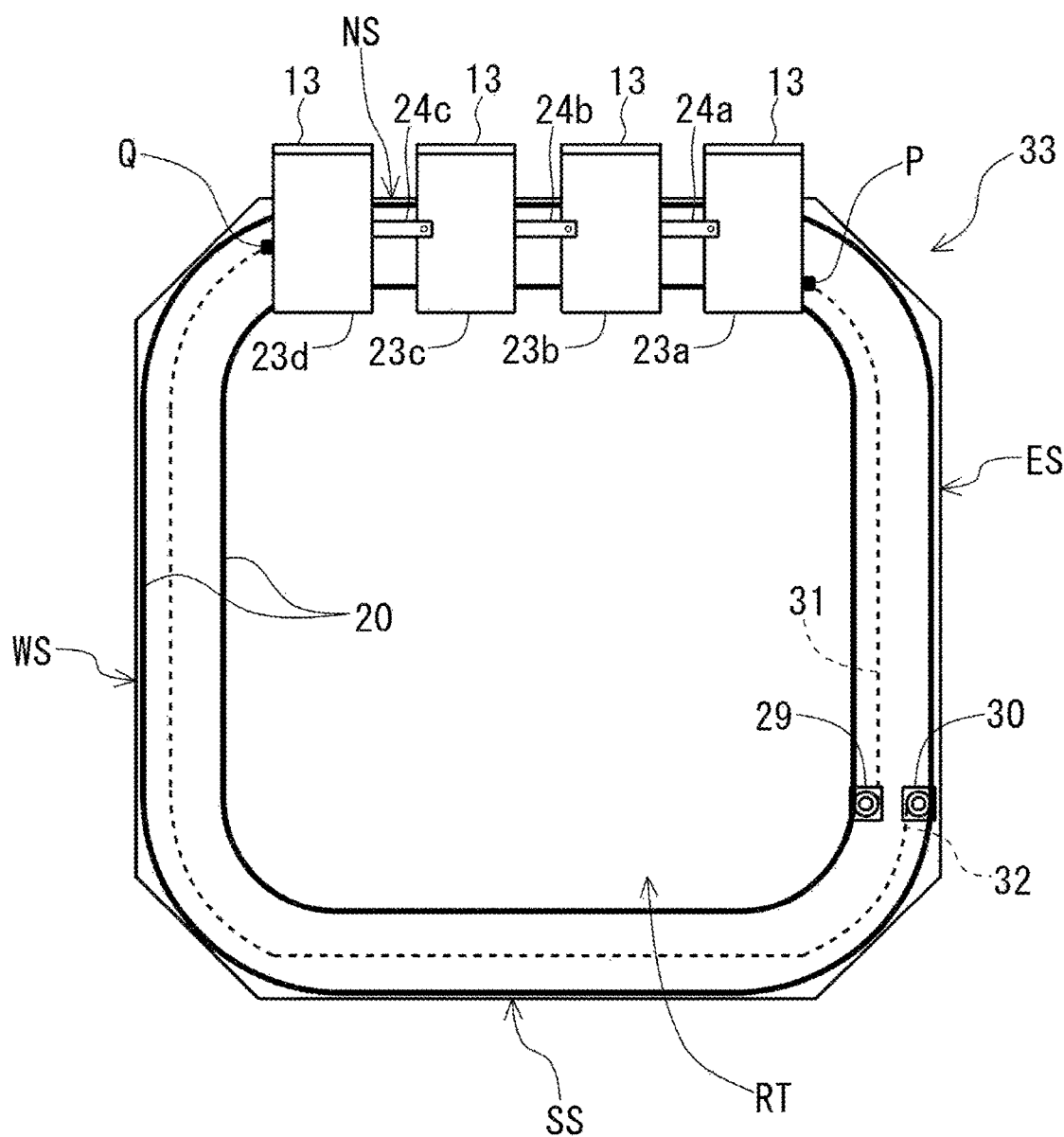
FIG. 13 is a plan view of the multiple support carriers located on the north.

In the state shown in FIG. 12, the winder 29 further winds the wire 31 to move the four support carriers 23a to 23d through the curved portion 22R (FIG. 10) of the first rail 20 to the straight portion 23 (FIG. 10) of the first rail 20, as shown in FIG. 13.

When the four support carriers 23a to 23d are on the straight portion 23 (FIG. 10), the four posts 10 (and the multiple solar panels 13 fixed to the posts 10) supported by the four support carriers 23a to 23d are adjacent to the north side surface NS.

When the four support carriers 23a to 23d are on the straight portion 23 (FIG. 10) of the first rail 20 as shown in FIG. 13, the winder 30 winds the wire 32 to move the four support carriers 23a to 23d counterclockwise along the first rail 20. In this case, the winder 29 unwinds the wire 31 counterclockwise.

The four support carriers 23a to 23d move through the curved portion 22R (FIG. 10) of the first rail 20 to the straight portion 22 (FIG. 10) of the first rail 20, as shown in FIG. 12. When the four support carriers 23a to 23d are on the straight portion 22 (FIG. 10), the four posts 10 (and the multiple solar panels 13 fixed to the posts 10) supported by the four support carriers 23a to 23d are adjacent to the west side surface WS.

In the state shown in FIG. 12, the winder 30 further winds the wire 32 to move the four support carriers 23a to 23d through the curved portion 21R (FIG. 10) of the first rail 20 to the straight portion 21 (FIG. 10) of the first rail 20, as shown in FIG. 8.

When the four support carriers 23a to 23d are on the straight portion 21 (FIG. 10), the four posts 10 (and the multiple solar panels 13 fixed to the posts 10) supported by the four support carriers 23a to 23d are adjacent to the south side surface SS.

The winders 29 and 30 may be controlled to wind or unwind the wires based on the movement of the sun. For example, the system may predefine the timing (time point) at which the multiple solar panels 13 located on the west side surface WS generate more power than located on the south side surface SS. The winders 29 and 30 may be controlled to move the four support carriers 23a to 23d from the straight portion 21 to the straight portion 22 of the first rail 20 at the predefined time point. The support carriers 23a to 23d can be moved to other side surfaces in the same manner.

In the above second embodiment, the posts 10 to which the multiple solar panels 13 are fixed are supported by the portions of the four support carriers 23a to 23d protruding outward from the building 33. The four support carriers 23a to 23d are moved by the winders 29 and 30 along the length of the first rail 20.

The four posts 10 supported by the four support carriers 23a to 23d can be moved to any of a position adjacent to the south side surface SS, a position adjacent to the west side surface WS, a position adjacent to the north side surface NS, or a position adjacent to the east side surface ES of the building 33. In other words, the solar panel installation system 1B can move the multiple solar panels 13 to any of a position adjacent to the south side surface SS, a position adjacent to the west side surface WS, a position adjacent to the north side surface NS, or a position adjacent to the east side surface ES of the building 33.

In the second embodiment, the support carrier 23a and the support carrier 23b are coupled with the coupler 24a. Similarly, the support carrier 23b and the support carrier 23c are coupled with the coupler 24b. The support carrier 23c and the support carrier 23d are coupled with the coupler 24c. The multiple (e.g., four) support carriers 23a to 23d can thus be installed on the first rail 20 in a movable manner.

2-2 Modification of Second Embodiment

The solar panel installation system according to the present invention is not limited to the above second embodiment, and may be changed or modified variously without departing from the spirit and scope of the present invention.

For example, in the second embodiment, the winders 29 and 30 are each used as an example of a carrier driver in one or more aspects of the present invention. In some embodiments, the support carrier 23a as the lead carrier and the support carrier 23d as the rear carrier may be battery-powered self-propelled carriers with a motor.

In the second embodiment of the present invention, the solar panel installation system 1B is added to an existing building 33, such as a mid- or high-rise apartment building. In some embodiments of the present invention, the solar panel installation system 1B may be installed on a structure (not shown) intended to incorporate the solar panel installation system 1i, such as a steel or wooden framework or a reinforced concrete structure.

Further, in the second embodiment, for example, the upper end of the post 10 is connected to the portion of the support carrier 23a protruding outward from the building 33, as shown in FIG. 9.

In some embodiments, the support structure for the solar panels 13 may include a base 5, a connecting wire 7, a post 10, a follower gear 12 fixed to the post 10, and a motor 15 that rotates the follower gear 12, similarly to the solar panel installation system 1A according to the first embodiment.

Figure 14:
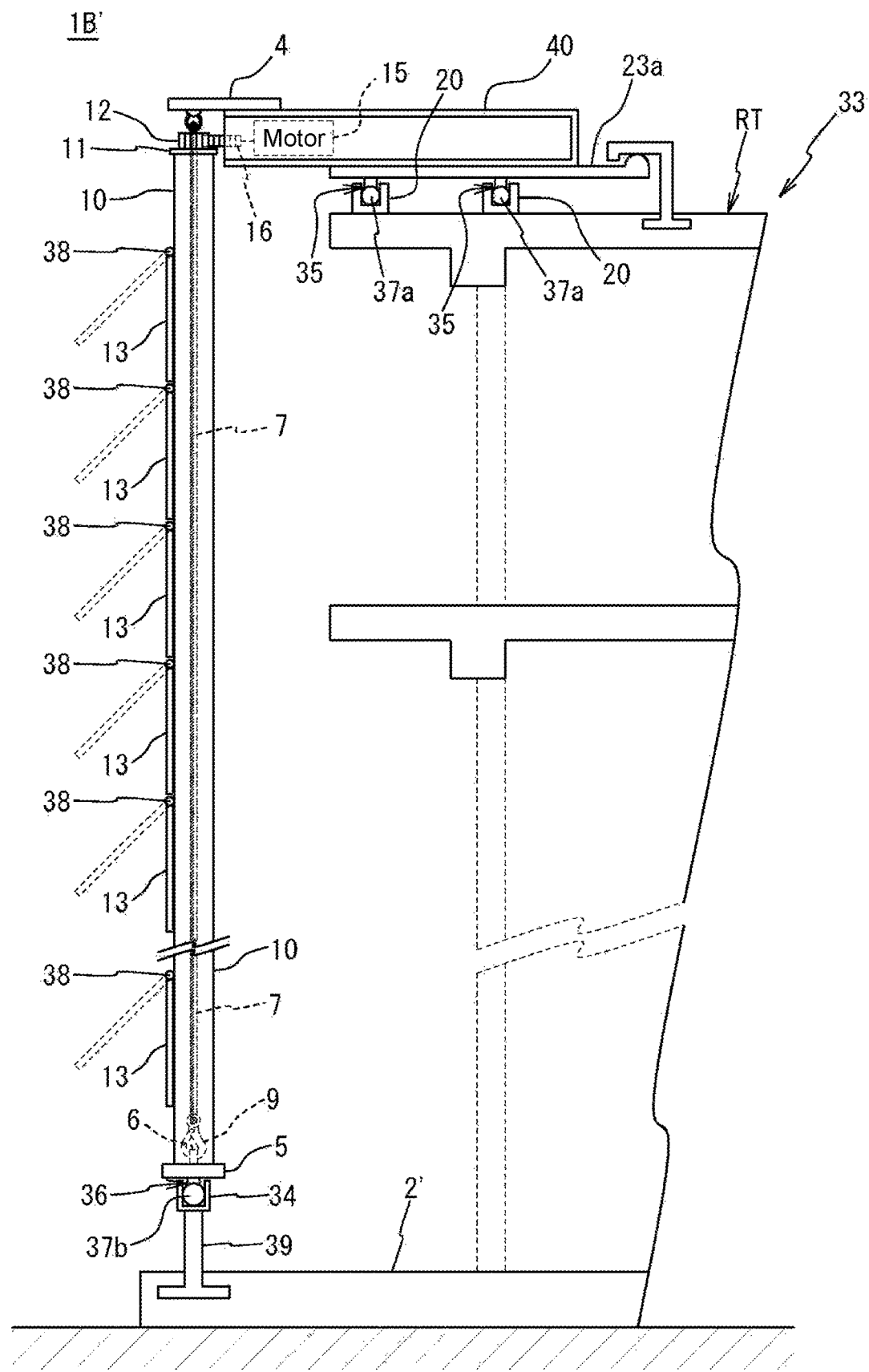
FIG. 14 is a vertical sectional view of a solar panel installation system according to a modification of the second embodiment of the present invention.

More specifically, as shown in the example in FIG. 14, a solar panel installation system 1B' according to a modification of the second embodiment may optionally include a housing 40 located on the support carrier 23a and protruding outward from the building 33. The housing 40 may include a support plate 4, to which the upper end of the connecting wire 7 may be fixed.

In this case, the post 10 may be located on the base 5 and extend from the base 5 toward the support plate 4, with the connecting wire 7 placed in a hollow in the post 10. In other words, the post 10 may be indirectly supported by the support carrier 23a and other support carriers.

The solar panel installation system 1B' according to the modification of the second embodiment shown in FIG. 14 can rotate the post 10 about the vertical axis in the circumferential direction of the post 10, similarly to the solar panel installation system 1A according to the first embodiment.

Thus, the solar panels 13 on the post 10 rotated based on the movement of the sun can generate power more efficiently. Further, with the rotator for the post 10 being simple, the solar panel installation system 1' according to the modification can be installed and maintained at lower cost.

In the solar panel installation system 1' according to the modification of the second embodiment, as shown in FIG. 14, the connecting wire 7 may be fixed to the base 5 using a hook 9 located at the lower end of the connecting wire 7 and using a hook engagement portion 6 located on the base 5.

This simplifies the structure for fixing the connecting wire 7 to the base 5. The entire solar panel installation system 1B' according to the modification thus has a simple structure, and can thus be installed and maintained at lower cost.

Further, as shown in FIG. 14, the solar panel installation system 1B' according to the modification of the second embodiment may include a second rail 34 at the lower end of the post 10. The post 10 may move with the lower end along the second rail 34 when the support carrier 23a and other support carriers move along the first rail 20.

Although not shown in FIG. 9, the solar panel installation system 1B according to the second embodiment has no support structure at the lower end of the post 10. In other words, in the solar panel installation system 1, the post 10 is simply suspended from the support carrier 23a.

In contrast, in the solar panel installation system 1B' according to the modification shown in FIG. 14, the post 10 moves with the lower end along the second rail 34 and is more stable at the lower end.

The entire solar panel installation system 1' according to the modification is thus more stable.

More specifically, as shown in the example in FIG. 14, the solar panel installation system 1B' according to the modification may include a second movable portion 36 located on the lower surface of the base 5 supporting the post 10. The second movable portion 36 is movable along the second rail 34.

In the example in FIG. 14, the second movable portion 36 is received in a groove on the second rail 34 being recessed in a cross section. However, the second movable portion 36 may have any other structure.

More specifically, the second movable portion 36 may include rollers (not shown) that roll along the left and right side surfaces of the second rail 34 being, for example, an elongated and solid rod (including curved portions).

This allows the post 10 to move smoothly along the length of the second rail 34 at the lower end.

As shown in FIG. 14, the solar panel installation system 1' according to the modification of the second embodiment may further include a first movable portion 35 located on the support carrier 23a and other support carriers. The first movable portion 35 is movable along the first rail 20.

In the example in FIG. 14, the first movable portion 35 is received in a groove on the first rail 20 being recessed in a cross section. However, the first movable portion 35 may have any other structure.

More specifically, the first movable portion 35 may include rollers (not shown) that roll along the left and right side surfaces of the first rail 20 being, for example, an elongated and solid rod (including curved portions).

This allows the support carrier 23a and other support carriers to move smoothly along the length of the first rail 20.

In the solar panel installation system 1B' according to the modification of the second embodiment, in particular, the support carrier 23a and other support carriers may include the first movable portion 35 with an electromagnet 37a, and the first rail 20 may be formed from steel.

When the electromagnet 37a is ON, the support carrier 23a and other support carriers including the first movable portion 35 can be fastened at an intended position on the first rail 20. When the electromagnet 37a is OFF, the support carrier 23a and other support carriers including the first movable portion 35 can move along the first rail 20.

This prevents unintended movement of the support carrier 23a and other support carriers along the first rail 20 cause by, for example, wind.

The solar panel installation system 1B' according to the above modification can increase the accuracy in controlling the positions of the support carrier 23a and other support carriers.

In the solar panel installation system 1B' according to the modification of the second embodiment, in particular, the second movable portion 36 at the lower end of the post 10 may include an electromagnet 37b, and the second rail 34 may be formed from steel.

When the electromagnet 37b is ON, the second movable portion 36 at the lower end of the post 10 can be fastened at an intended position on the second rail 34. When the electromagnet 37b is OFF, the second movable portion 36 at the lower end of the post 10 can move along the second rail 34. This prevents swing of the post 10 cause by, for example, wind.

In the solar panel installation system 1B' according to the above modification, the post 10 can move more stably as the support carrier 23a and other carriers move. The solar panel installation system 1B' can have higher safety.

In the solar panel installation system 1B' according to the modification of the second embodiment, as shown in FIG. 14, each solar panel 13 may be fixed to the post 10 optionally with a hinge shaft 38 (horizontal shaft).

In this case, each solar panel 13 fixed to the post 10 is pivotable about the hinge shaft 38 (horizontal shaft).

The above solar panel installation system 1B' can thus move a group of solar panels 13 together to an intended side surface of the building 33 or of the structure (not shown), can change the orientation of each solar panel 13 in the circumferential direction of the post 10, and can also change the orientation of each solar panel 13 about the horizontal shaft (e.g., the hinge shaft 38).

In other words, the solar panel installation system 1B' according to the above modification can generate more power with fewer solar panels 13.

In the example in FIG. 14, the second rail 34 is located at the upper end of a support structure 39 upright on a concrete foundation 2'. In some embodiments, the second rail 34 may be embedded in or located on the concrete foundation 2' (not shown).

This also produces the same effects as with the second rail 34 supported on the support structure 39.

2-3 Second Embodiment of Invention

The above solar panel installation system 1B or 1' according to the second embodiment may be defined as aspects 6 to 18 below.

6. A solar panel installation system (1, 1B'), comprising:
   a first rail (20) on a rooftop of a building (33) or on a structure;
   a first support carrier (e.g., the support carrier 23a) located on the first rail (20) and including a portion protruding outward from the building (33) or from the structure, the first support carrier (e.g., the support carrier 23a) being movable along the first rail (20);
   a first post (10) directly or indirectly supported by the portion of the first support carrier (e.g., the support carrier 23a) protruding outward from the building (33) or from the structure, the first post (10) extending in a vertical direction along a side surface of the building (33) or of the structure;
   a plurality of solar panels (13) fixed to the first post (10); and
   a carrier driver configured to move the first support carrier (e.g., the support carrier 23a) in a first direction along a length of the first rail (20) or in a second direction opposite to the first direction.

7. The solar panel installation system (1B, 1B') according to aspect 6, wherein
   the building (33) or the structure includes the side surface including a first side surface and a second side surface,
   the first rail (20) includes a first portion (e.g., the straight portion 21) being straight and extending along the first side surface, a second portion (e.g., the straight portion 22) being straight and extending along the second side surface, and a curved portion (e.g., the curved portion 21R) connecting the first portion and the second portion, and
   the carrier driver moves the first support carrier (e.g., the support carrier 23a) from the first portion (e.g., the straight portion 21) to the second portion (e.g., the straight portion 22) through the curved portion (e.g., the curved portion 21R), and moves the first support carrier (e.g., the support carrier 23a) from the second portion (e.g., the straight portion 22) to the first portion (e.g., the straight portion 21) through the curved portion (e.g., the curved portion 21R).

8. The solar panel installation system (1B, 1B') according to aspect 7, wherein
   the carrier driver moves the first support carrier (e.g., the support carrier 23a) from the first portion (e.g., the straight portion 21) to the second portion (e.g., the straight portion 22) in response to a predetermined time point being reached.

9. The solar panel installation system (1B, 1B') according to aspect 6, wherein
   the carrier driver includes a first winder (29) configured to move the first support carrier (e.g., the support carrier 23a) in the first direction and a second winder (30) configured to move the first support carrier (e.g., the support carrier 23a) in the second direction,
   the first winder (29) winds a first wire (31) connected to an end of the first support carrier (e.g., the support carrier 23a) in a movement direction of the first support carrier (e.g., the support carrier 23a) to move the first support carrier (e.g., the support carrier 23a) in the first direction, and
   the second winder (30) winds a second wire (32) connected to another end of the first support carrier (e.g., the support carrier 23a) in the movement direction to move the first support carrier (e.g., the support carrier 23a) in the second direction.

10. The solar panel installation system (1B, 1B') according to aspect 7, further comprising:
    a second support carrier (e.g., the support carrier 23b) spaced from the first support carrier (e.g., the support carrier 23a) in a movement direction of the first support carrier (e.g., the support carrier 23a), the second support carrier (e.g., the support carrier 23b) being movable along the first rail (20), the second support carrier (e.g., the support carrier 23b) being coupled to the first support carrier (e.g., the support carrier 23a) with a coupler (e.g., the coupler 24a), the second support carrier (e.g., the support carrier 23b) being located on the first rail (20) and including a portion protruding outward from the building (33) or from the structure;
    a second post (10) directly or indirectly supported by the portion of the second support carrier protruding outward from the building (33) or from the structure, the second post (10) extending in the vertical direction along the side surface of the building (33) or of the structure; and
    a plurality of solar panels (13) fixed to the second post (10),
    wherein the carrier driver moves the first support carrier (e.g., the support carrier 23a) and the second support carrier (e.g., the support carrier 23b) from the first portion (e.g., the straight portion 21) to the second portion (e.g., the straight portion 22) through the curved portion (e.g., the curved portion 21R), and moves the first support carrier (e.g., the support carrier 23a) and the second support carrier (e.g., the support carrier 23b) from the second portion (e.g., the straight portion 22) to the first portion (e.g., the straight portion 21) through the curved portion (e.g., the curved portion 21R).

11. The solar panel installation system (1B, 1B') according to any one of aspects 6 to 10, further comprising:
    a gear (e.g., the follower gear 12) fixed directly or indirectly to the first post (10); and
    a drive included in the first support carrier (e.g., the support carrier 23a), the drive being configured to rotate the gear (e.g., the follower gear 12) to rotate the first post (10) in a circumferential direction of the first post (10).

12. The solar panel installation system (1B') according to aspect 11, wherein
    the drive includes a drive gear (16) meshing with the gear (e.g., the follower gear 12), and a motor (15) configured to rotate the drive gear (16), and
    the gear (e.g., the follower gear 12) rotates in response to rotation of the drive gear (16).

13. The solar panel installation system (1B') according to any one of aspects 6 to 12, further comprising:
    a base (5) at a lower end of the first post (10);

a connecting wire (7) placed in a hollow in the first post (10) being tubular, the connecting wire (7) connecting the base (5) to the portion of the first support carrier (e.g., the support carrier 23a) protruding outward from the building (33) or from the structure;

a hook (9) at a lower end of the connecting wire (7); and a hook engagement portion (6) on the base (5), wherein the connecting wire (7) has the lower end connected to the base (5) with the hook (9) being hooked on the hook engagement portion (6).

14. The solar panel installation system (1B') according to any one of aspects 11 to 13, wherein the first post (10) includes a plate (e.g., the lid plate 11) fixed to an upper end of the first post (10), and the gear (e.g., the follower gear 12) is fixed to the first post (10) with the plate (e.g., the lid plate 11) between the gear (e.g., the follower gear 12) and the first post (10).

15. The solar panel installation system (1B') according to any one of aspects 6 to 14, wherein the first rail (20) comprises steel, the first support carrier (e.g., the support carrier 23a) includes a first movable portion (35) movable along the first rail (20), and the first movable portion (35) includes an electromagnet (37a).

16. The solar panel installation system (1B') according to any one of aspects 6 to 15, further comprising:

a second rail (34) at a lower end of the first post (10), wherein the first post (10) moves with the lower end along the second rail (34) in response to movement of the first support carrier (e.g., the support carrier 23a).

17. The solar panel installation system (1B') according to aspect 16, wherein the second rail (34) comprises steel, the first post (10) includes a second movable portion (36) at the lower end, and the second movable portion (36) is movable along the second rail (34), and the second movable portion (36) includes an electromagnet (37b).

18. The solar panel installation system (1B') according to any one of aspects 6 to 17, wherein each of the plurality of solar panels (13) is fixed to the post (10) in a manner pivotable about a horizontal shaft (e.g., the hinge shaft 38).

2-4 Effects of Aspects 6 to 18

The system according to aspect 6 can move the solar panels 13 fixed to the post 10 to an intended side surface of the building 33 or of the structure (not shown). In other words, the system according to aspect 6 includes a minimum number of solar panels 13 that can be moved and shared, rather than including solar panels 13 covering all the side surfaces of the building 33 or of the structure (not shown) for solar power generation. The system according to aspect 6 can thus generate an intended amount of power with fewer solar panels 13.

Thus, the system according to aspect 6 can reduce the equipment cost for solar power generation as compared with the systems in aspects 1 to 5.

The system according to aspect 7 has the same effects as in aspect 6. Further, the system can smoothly move the support carrier (e.g., the support carrier 23a), or in other words, smoothly move the solar panels 13 fixed to the post 10.

Thus, in the system according to aspect 7, the support carrier (e.g., the support carrier 23a) has high operability.

The system according to aspect 8 has the same effects as in aspect 7. Further, the system can move the solar panels 13 to any side surface of the building 33 or of the structure (not shown) appropriate for power generation based on the altitude of the sun. The system according to aspect 8 can thus generate power more efficiently.

The system according to aspect 9 has the same effects as in aspect 6. Further, the carrier driver has a simple structure. The system according to aspect 9 can thus be installed at still lower cost.

The system according to aspect 10 has the same effects as in aspect 7. Further, the multiple solar panels 13 can be moved together using a simple drive unit.

The system according to aspect 10 can thus be installed and maintained at lower cost.

The system according to aspect 11 has the same effects as in each of aspects 6 to 10, and also has the effects of aspect 1. The system can thus move the solar panels 13 to an intended side surface of the building 33 or of the structure, and can also change the orientation of each solar panel 13 about the vertical axis in the circumferential direction of the post 10. Thus, in the system according to aspect 11, each solar panel 13 can be easily maintained to face in a direction appropriate for power generation and can generate power more efficiently.

The structure according to aspect 12 includes components of the structure according to aspect 11 being specifically identified, and has the same effects as in aspect 11. The solar panel installation system 1B' according to aspect 12 can simplify the structure of the drive, and can thus be installed and maintained at lower cost.

The system according to aspect 13 has the same effects as in each of aspects 6 to 12. Further, the post 10 can be lighter and driven with a simpler and lighter drive unit.

Thus, the solar panel installation system 1B' according to aspect 13 can avoid having larger size and more weight. The system according to aspect 13 can thus be installed at lower cost.

The system according to aspect 14 has the same effects as in each of aspects 6 to 13. Further, the rotator for the post 10 can be stronger and more durable.

Thus, the entire solar panel installation system 1B' according to aspect 14 can be stronger and more durable than without the plate (e.g., the lid plate 11) between the gear (e.g., the follower gear 12) and the post 10.

The system according to aspect 15 has the same effects as in each of aspects 6 to 14. Further, the system prevents unintended movement of a stopped support carrier (e.g., the support carrier 23a) cause by, for example, wind.

Thus, the system according to aspect 15 can be safer in use and can more accurately control the position of the support carrier (e.g., the support carrier 23a).

The system according to aspect 16 has the same effects as in each of aspects 6 to 15. Further, the system increases the stability of the post 10 at its lower end.

The system according to aspect 16 prevents swing of the post 10 cause by, for example, wind when in use. Thus, the solar panel installation system according to aspect 16 can be safer in use and more durable than without the second rail 34.

The system according to aspect 17 has the same effects as in aspect 16. Further, the system can more accurately control the position of the post 10 on the support carrier (e.g., the support carrier 23a) being stopped.

This allows the post 10 to be positioned highly accurately as intended, thus allowing the solar panels 13 to generate power more efficiently.

The system according to aspect 18 has the same effects as in each of aspects 6 to 16. Further, each solar panel 13 fixed to the post 10 is pivotable about the horizontal shaft (e.g., the hinge shaft 38). The orientations of the solar panels 13 in aspect 18 are thus adjustable finely and highly accurately as appropriate for power generation. Thus, in the system according to aspect 18, the solar panels 13 can generate power more efficiently than solar panels 13 that are not pivotable about the horizontal shaft (e.g., the hinge shaft 38).

REFERENCE SIGNS LIST 1A, 1B, 1B' solar panel installation system
2, 2' concrete foundation
3 beam
4 support plate
5 base
6 hook engagement portion
7 connecting wire
8 wire support ring
9 hook
10 post
11 lid plate
12 follower gear
13 solar panel
14 support frame
15 motor
16 drive gear
17 building
20 first rail
21, 22, 23, 24 straight portion
21R, 22R, 23R curved portion
23a, 23b, 23c, 23d support carrier
24a, 24b, 24c coupler
25 column
26 U-shaped member
27 coupler plate
28 hinge shaft
29, 30 winder
31, 32 wire
33 building
34 second rail
35 first movable portion
36 second movable portion
37a, 37b electromagnet
38 hinge shaft
39 support structure
40 housing
P front end
Q rear end
ES east side surface
NS north side surface
RT rooftop
SS south side surface
WS west side surface

The invention claimed is:

1. A solar panel installation system (1, 1B'), comprising:
a first rail (20) on a rooftop of a building (33) or on a structure;
a first support carrier (23a, 23b, 23c, 23d) located on the first rail (20) and including a portion protruding outward from the building (33) or from the structure, the first support carrier (23a, 23b, 23c, 23d) being movable along the first rail (20);
a first post (10) directly or indirectly supported by the portion of the first support carrier (23a, 23b, 23c, 23d) protruding outward from the building (33) or from the structure, the first post (10) extending in a vertical direction along a side surface of the building (33) or of the structure;
a plurality of solar panels (13) fixed to the first post (10); and
a carrier driver configured to move the first support carrier (23a, 23b, 23c, 23d) in a first direction along a length of the first rail (20) or in a second direction opposite to the first direction.

2. The solar panel installation system (1, 1B') according to claim 1, wherein
the building (33) or the structure includes the side surface including a first side surface and a second side surface,
the first rail (20) includes a first portion being straight and extending along the first side surface, a second portion being straight and extending along the second side surface, and a curved portion connecting the first portion and the second portion, and
the carrier driver moves the first support carrier (23a, 23b, 23c, 23d) from the first portion to the second portion through the curved portion, and moves the first support carrier (23a, 23b, 23c, 23d) from the second portion to the first portion through the curved portion.

3. The solar panel installation system (1B, 1B') according to claim 2, wherein
the carrier driver moves the first support carrier (23a, 23b, 23c, 23d) from the first portion to the second portion in response to a predetermined time point being reached.

4. The solar panel installation system (1B, 1B') according to claim 1, wherein
the carrier driver includes a first winder (29) configured to move the first support carrier (23a, 23b, 23c, 23d) in the first direction and a second winder (30) configured to move the first support carrier (23a, 23b, 23c, 23d) in the second direction,
the first winder (29) winds a first wire (31) connected to an end of the first support carrier (23a, 23b, 23c, 23d) in a movement direction of the first support carrier (23a, 23b, 23c, 23d) to move the first support carrier (23a, 23b, 23c, 23d) in the first direction, and
the second winder (30) winds a second wire (32) connected to another end of the first support carrier (23a, 23b, 23c, 23d) in the movement direction to move the first support carrier (23a, 23b, 23c, 23d) in the second direction.

5. The solar panel installation system (1B, 1B') according to claim 2, further comprising:
a second support carrier (23b, 23c, 23d) spaced from the first support carrier (23a, 23b, 23c) in a movement direction of the first support carrier (23a, 23b, 23c), the second support carrier (23b, 23c, 23d) being movable along the first rail (20), the second support carrier (23b, 23c, 23d) being coupled to the first support carrier (23a, 23b, 23c) with a coupler (24a, 24b, 24c), the second support carrier (23b, 23c, 23d) being located on the first rail (20) and including a portion protruding outward from the building (33) or from the structure;
a second post (10) directly or indirectly supported by the portion of the second support carrier (23b, 23c, 23d) protruding outward from the building (33) or from the structure, the second post (10) extending in the vertical direction along the side surface of the building (33) or of the structure; and
a plurality of solar panels (13) fixed to the second post (10),
wherein the carrier driver moves the first support carrier (23a, 23b, 23c) and the second support carrier (23b, 23c, 23d) from the first portion to the second portion through the curved portion, and moves the first support carrier (23a, 23b, 23c) and the second support carrier (23b, 23c, 23d) from the second portion to the first portion through the curved portion.

6. The solar panel installation system (1B') according to claim 1, further comprising:
    a gear (12) fixed directly or indirectly to the first post (10); and
    a drive included in the first support carrier (23a, 23b, 23c, 23d), the drive being configured to rotate the gear (12) to rotate the first post (10) in a circumferential direction of the first post (10).

7. The solar panel installation system (1B') according to claim 6, wherein
    the drive includes a drive gear (16) meshing with the gear (12), and a motor (15) configured to rotate the drive gear (16), and
    the gear (12) rotates in response to rotation of the drive gear (16).

8. The solar panel installation system (1B') according to claim 1, further comprising:
    a base (5) at a lower end of the first post (10);
    a connecting wire (7) placed in a hollow in the first post (10) being tubular, the connecting wire (7) connecting the base (5) to the portion of the first support carrier (23a, 23b, 23c, 23d) protruding outward from the building (33) or from the structure;
    a hook (9) at a lower end of the connecting wire (7); and
    a hook engagement portion (6) on the base (5),
    wherein the connecting wire (7) has the lower end connected to the base (5) with the hook (9) being hooked on the hook engagement portion (6).

9. The solar panel installation system (1B') according to claim 6, wherein
    the first post (10) includes a plate (11) fixed to an upper end of the first post (10), and
    the gear (12) is fixed to the first post (10) with the plate (11) between the gear (12) and the first post (10).

10. The solar panel installation system (1B') according to claim 1, wherein
    the first rail (20) comprises steel,
    the first support carrier (23a, 23b, 23c, 23d) includes a first movable portion (35) movable along the first rail (20), and
    the first movable portion (35) includes an electromagnet (37a).

11. The solar panel installation system (1B') according to claim 1, further comprising:
    a second rail (34) at a lower end of the first post (10),
    wherein the first post (10) moves with the lower end along the second rail (34) in response to movement of the first support carrier (23a, 23b, 23c, 23d).

12. The solar panel installation system (1B') according to claim 11, wherein
    the second rail (34) comprises steel,
    the first post (10) includes a second movable portion (36) at the lower end, and the second movable portion (36) is movable along the second rail (34), and
    the second movable portion (36) includes an electromagnet (37b).

* * * * *